(12) United States Patent
Sauer et al.

(10) Patent No.: US 7,239,330 B2
(45) Date of Patent: *Jul. 3, 2007

(54) AUGMENTED REALITY GUIDED INSTRUMENT POSITIONING WITH GUIDING GRAPHICS

(75) Inventors: Frank Sauer, Princeton, NJ (US); Ali Bani-Hashemi, Walnut Creek, CA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 338 days.

This patent is subject to a terminal disclaimer.

(21) Appl. No.: 10/963,852

(22) Filed: Oct. 13, 2004

(65) Prior Publication Data

US 2005/0093889 A1    May 5, 2005

Related U.S. Application Data

(63) Continuation of application No. 09/818,122, filed on Mar. 27, 2001, now Pat. No. 6,856,324.

(51) Int. Cl.
*G09G 5/00* (2006.01)

(52) U.S. Cl. .................................... 345/633

(58) Field of Classification Search ................ None
See application file for complete search history.

(56) References Cited

U.S. PATENT DOCUMENTS

| | | | | |
|---|---|---|---|---|
| 5,531,227 | A * | 7/1996 | Schneider | 600/425 |
| 5,638,819 | A * | 6/1997 | Manwaring et al. | 600/424 |
| 6,083,162 | A * | 7/2000 | Vining | 600/407 |
| 6,113,395 | A * | 9/2000 | Hon | 434/262 |
| 6,246,898 | B1 * | 6/2001 | Vesely et al. | 600/424 |
| 6,346,940 | B1 * | 2/2002 | Fukunaga | 345/427 |
| 6,380,958 | B1 * | 4/2002 | Guendel et al. | 715/848 |
| 6,616,610 | B2 * | 9/2003 | Steininger et al. | 600/443 |
| 6,923,768 | B2 * | 8/2005 | Camus et al. | 600/463 |

\* cited by examiner

*Primary Examiner*—Mark Zimmerman
*Assistant Examiner*—Peter-Anthony Pappas
(74) *Attorney, Agent, or Firm*—Michele L. Conover

(57) ABSTRACT

There is provided a method for augmented reality guided instrument positioning. A graphics guide is determined for positioning an instrument that provides a substantially unobstructed view of the instrument during the positioning. The graphics guide is rendered in alignment with a predetermined path to be traversed during the positioning of the instrument.

13 Claims, 23 Drawing Sheets not aligned aligned not aligned aligned target depth not yet reached      taget depth reached

AUGMENTED REALITY GUIDED INSTRUMENT POSITIONING WITH GUIDING GRAPHICS

CROSS REFERENCE TO RELATED APPLICATION

This application is a continuation of U.S. patent application Ser. No. 09/818,122 filed on Mar. 27, 2001 and entitled "Augmented Reality Guided Instrument Positioning with Guiding Graphics", now U.S. Pat. No. 6,856,324 B2.

BACKGROUND

1. Technical Field

The present invention generally relates to augmented reality and, in particular, to a method for augmented reality guided instrument positioning with guiding graphics.

2. Background Description

Augmented reality, also commonly referred to as augmented vision or augmented reality vision, augments an observer's view of the real world by superimposing computer generated graphical information. This information may be as simple as a text label attached to some object in the scene, or as complex as a 3D model of a patient's brain derived from an MRI scan and aligned to the real view of the person's head.

The observer may observe a real scene directly with his or her eyes, with the additional graphical information being blended therewith via a semi-transparent display located between the observer and the real scene. Such a display device can be, for example, a see-through head mounted display.

The display can also be opaque, like a computer screen or a non-see-through head mounted display. Such a display then presents to the observer the complete augmented view, i.e., a combination of the real-world view and the graphics overlay. A video camera takes the place of the real-world observer to capture the real world-view. For stereo vision, two cameras are required. A computer is used to combine the live video with the graphics augmentation.

The graphics have to be positioned, oriented, and scaled, or even rendered in a perspective fashion for correct alignment with the real-world view. It is desirable to "anchor" the graphics to a real-world object. To do this, the position and orientation of the camera with respect to the object, as well as the orientation of the object, must be known. That is, the relationship between two coordinate systems, one corresponding to the camera and the other corresponding to the object, must be known.

Tracking denotes the process of keeping track of the preceding relationship. Commercial tracking systems are available that are based on optical, mechanical, magnetic, inertial, and ultrasound measurement principles.

FIG. 1 is a block diagram illustrating an augmented reality system 100 wherein video images of the real world are combined with computer generated graphics, according to the prior art. The system 100 includes: a video camera 110; external trackers 112; 2D/3D graphics module 114; an image processing module 116; a pose calculation module 118; a graphics rendering module 120; a video and graphics overlay module 122; and a display 124. As is known, a 3D perception may be achieved through the use of two cameras and a stereo display.

The operation of the elements typically employed in an augmented reality system as well as the calibration required of such a system is described by: Ahlers et al., in "Calibration Requirements and Procedures for a Monitor-based Augmented Reality System", IEEE Transactions on Visualization and Computer Graphics, 1 (3): 255-273, 1995; Navab et al., in "Single Point Active Alignment Method (SPAAM) for Calibrating an Optical See-through Head Mounted Display", Proc. of the IEEE International Symposium on Augmented Reality, ISAR '00, Munich, Germany, October 2000; and Sauer et al., "Augmented Workspace: Designing an AR Testbed", Proc. of the IEEE International Symposium on Augmented Reality, ISAR '00, Munich, Germany, October 2000.

Augmented reality visualization can guide a user in manual mechanical tasks. For machine repair and maintenance scenarios, it has been suggested to augment the view with graphical pointers that show, e.g., which button to press or which screw to turn. Augmented reality visualization is also being suggested for medical applications where, e.g., biopsy needles have to be inserted into a target tumor without harming nearby nerves or where screws have to be inserted into bones at a precise location and in a precise direction.

A description of one of the main problems with augmented reality visualization, i.e., occlusion, will now be given. As noted above, augmented Reality visualization places virtual objects (computer generated graphics) into real scenes. The tracking of the vantage point, from which the real scene is viewed, with respect to a world coordinate system anchored at real world objects, allows the virtual objects to appear at desired locations in this world coordinate system. However, a correct visual interaction between real and virtual objects generally requires 3D information about the real objects. Disadvantageously, this 3D information is usually not available and, thus, the virtual objects are simply superimposed onto the image of the real scene. Accordingly, real objects can be hidden by virtual objects, although virtual objects cannot be hidden by real objects.

To illustrate the problem of occlusion, consider the following example: a simple virtual object such as a cube is superimposed onto a real scene, with all the real objects being farther away from the observer than the virtual cube. If this augmented scene is shown to the observer in stereo, the observer can easily perceive the correct 3D position of the cube. Now the observer inserts his hand in the scene so that his hand is in the foreground and occludes the position where the virtual cube is supposed to be. Since the system has no knowledge of the hand, the system still shows the virtual cube superimposed onto the scene image. The inability of the (real) hand to occlude the virtual cube confuses the 3D perception of the observer. The observer receives conflicting depth cues: the stereo depth cues tell the observer that the cube is behind the hand, the occlusion cue tells the observer that the cube must be in front of the hand (because otherwise it would be hidden by the hand).

Accordingly, it would be desirable and highly advantageous to have a method for augmented reality guided instrument positioning which is not adversely affected by occlusion.

SUMMARY OF THE INVENTION

The problems stated above, as well as other related problems of the prior art, are solved by the present invention, a method and apparatus for augmented reality guided instrument positioning with guiding graphics. The present invention overcomes the occlusion problem of the prior art by providing graphics guides which enable the positioning of instruments (e.g., medical instruments) with respect to a target location (e.g., on a patient) without substantial occlusion.

According to an aspect of the invention, there is provided a method for augmented reality guided instrument positioning. A graphics guide is determined for positioning an instrument that provides a substantially unobstructed view of the instrument during the positioning. The graphics guide is rendered in alignment with a predetermined path to be traversed during the positioning of the instrument.

According to another aspect of the invention, there is provided an apparatus for augmented reality guided instrument positioning. A graphics guide generator generates a graphics guide that provides a substantially unobstructed view of the instrument during a positioning of the instrument. A rendering device renders the graphics guide in alignment with a predetermined path to be traversed during the positioning of the instrument.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for augmented reality guided instrument positioning with guiding graphics. The present invention overcomes the occlusion problem of the prior art by providing graphics guides which enable the positioning of instruments (e.g., medical instruments) with respect to a target location (e.g., on a patient) without substantial occlusion.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
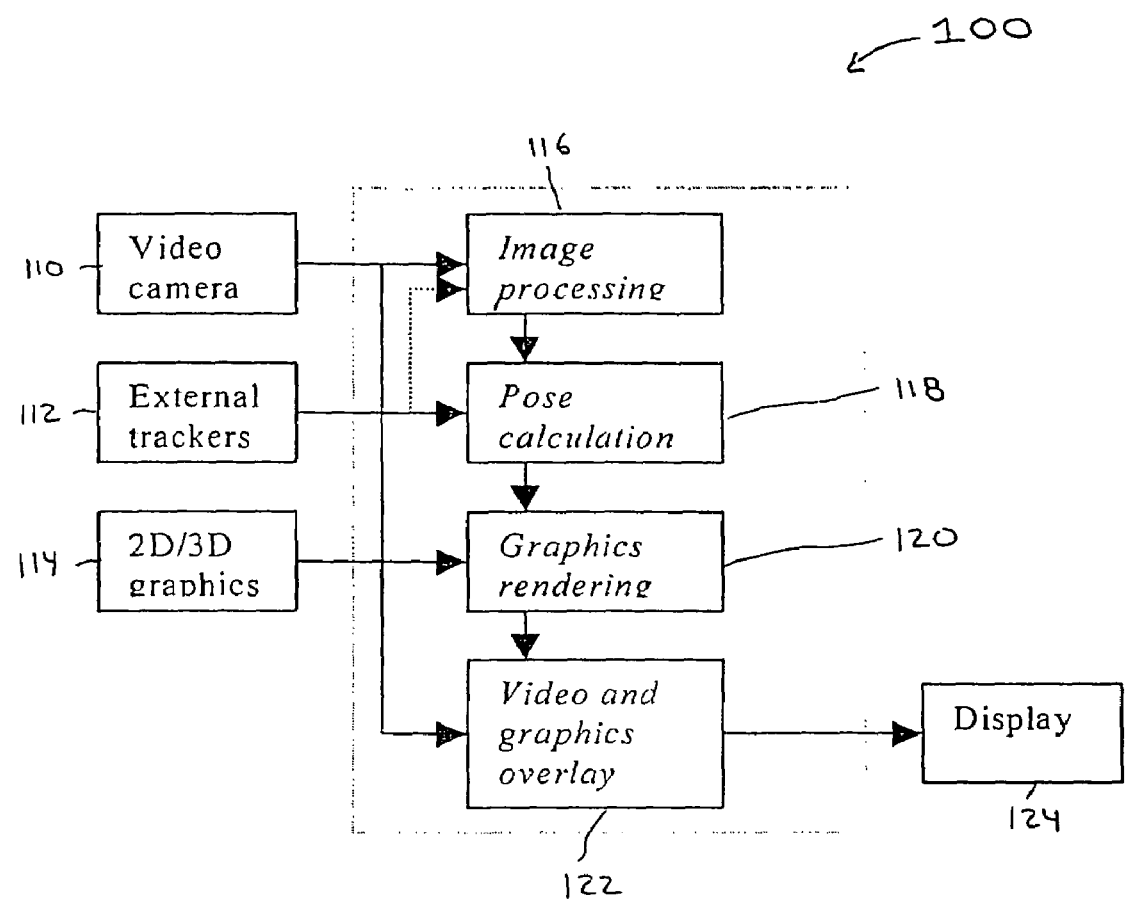
FIG. 1 is a block diagram illustrating an augmented reality system 100 wherein video images of the real world are combined with computer generated graphics, according to the prior art.
Figure 2:
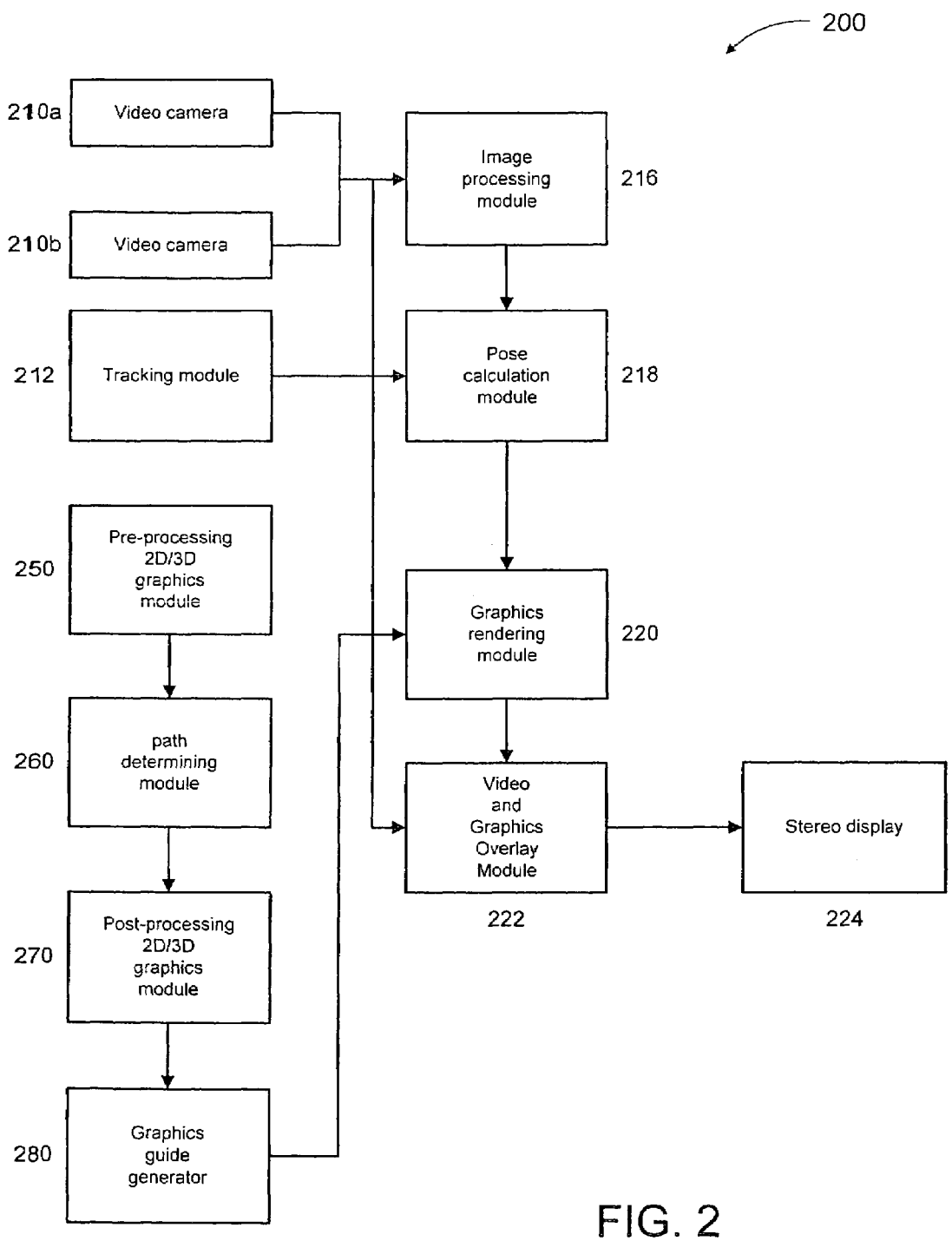
FIG. 2 is a block diagram of an augmented reality guided instrument positioning system, according to an illustrative embodiment of the present invention.

FIG. 2 is a block diagram of an augmented reality guided instrument positioning system 200, according to an illustrative embodiment of the present invention. The system 200 includes: two video cameras 210a-b; a tracking module 212; a pre-processing 2D/3D graphics module 250; a path determining device 260; a post-processing 2D/3D graphics module 270; a graphics guide generator 280; an image processing module 216; a pose calculation module 218; a graphics rendering module 220; a video and graphics overlay module 222; and a stereo display 224. The two video cameras 210a-b and the stereo display 224 are employed to obtain 3D perception. Of course, other arrangements may be used (e.g., single video camera and non-stereo display) which maintain the spirit and scope of the present invention. In the illustrative embodiment of FIG. 2, the path determining module 260 and the graphics guide generator 280 are stand alone elements of the system 200. However, as readily appreciated by one of ordinary skill in the related, these elements may be integrated into other elements of the system 200 (e.g., the graphics rendering module 220). Given the teachings of the present invention provided herein, one of ordinary skill in the related art will contemplate these and various other configurations of the elements of FIG. 2, while maintaining the spirit and scope of the present invention.

The following description of the elements of FIG. 2 will be given with respect to augmented reality guided instrument applications. The two video cameras 210a-b provide image related data corresponding to the real world to the system 200. The tracking module 212 provides data corresponding to the relationship between a user coordinate system (i.e., with respect to the vantage point of the user or the vantage point of the cameras that replace the eyes of the user), a coordinate system of the object (e.g., patient) to which the instrument is being applied and, optionally, an instrument coordinate system. The data provided by the tracking module 212 allows for the relationship(s) between the preceding coordinate systems to be known or finally calculated in the pose calculation module 218. The data provided through the pre-processing 2D/3D graphics module 250 may be, e.g., a Computer Tomographic (CT) scan or Magnetic Resonance (MR) image, preprocessed for a specific instrument positioning application. The data provided through the pre-processing 2D/3D graphics module 250 may also include geometrical information about the instrument. From information output from the pre-processing 2D/3D graphics module 250 to the path determining module 260, one or more potential paths for the instrument to travel and/or one or more potential target locations for the instrument to contact/penetrate may be determined. The path/target data as well as some data passed through the path determining module 260 from the pre-processing 2D/3D graphics module 250 is input to the post-processing module 270 which provides the data to the graphics guide generator 280 for use in generating graphics guides. It is to be appreciated that data which specifies one or more preferred types of graphics guides to be used during the positioning of the instrument may be input to the pre-processing 2D/3D graphics module 250 for ultimate use by the graphics guide generator 280 in selecting a type(s) of graphics guide to generate. Some illustrative types of graphics guides are shown in FIGS. 3 through 6.

The image processing module 216 processes the image data provided from the two video cameras 210a-b. Processed image data from the image processing module 216 is input to the pose calculation module 218 along with the data provided from the tracking module 212. Data from the graphics guide generator 280 corresponding to one or more graphics guides is input to the graphics rendering module 220 along with the data output from the pose calculation module 218 so that the graphics can be rendered according to the camera pose, to be registered with respect to the object (to which the instrument is to be applied) seen in the video images. Rendered data is provided to the video and graphics overlay module 222 for subsequent display on the stereo display 224.

The operations and capabilities of the elements of system 200 are further described in detail with respect to FIGS. 3-7. For the sake of brevity, additional conventional operations performed by any of the elements of system 200 have essentially been omitted. For additional details on these conventional operations, please see, e.g.: Ahlers et al., in "Calibration Requirements and Procedures for a Monitor-based Augmented Reality System", IEEE Transactions on Visualization and Computer Graphics, 1 (3): 255-273, 1995; Navab et al., in "Single Point Active Alignment Method (SPAAM) for Calibrating an Optical See-through Head Mounted Display", Proc. of the IEEE International Symposium on Augmented Reality, ISAR '00, Munich, Germany, October 2000; and Sauer et al., "Augmented Workspace:

Designing an AR Testbed", Proc. of the IEEE International Symposium on Augmented Reality, ISAR '00, Munich, Germany, October 2000.

The present invention is directed to augmented reality guided instrument positioning with guiding graphics. The invention may be employed in the case when an instrument has to be positioned with a fairly high accuracy, and where a target or a target and a path can be pre-selected and can be shown to the user as graphical guides in an augmented reality view. The guiding graphics mark the target. The guiding graphics may also possibly mark the final instrument position and/or orientation. Further, the guiding graphics may possibly mark the path to the final instrument pose. The user then aligns the instrument with the graphics guides to perform his or her task.

It is to be appreciated that the occlusion problem presents a significant obstacle to using augmented reality for instrument guidance. The real instrument has to be brought close to the location of the virtual guides, and only if one can clearly perceive their relative 3D locations can one perform the alignment reliably.

Consider the example of a graphics guide for positioning a needle. A cylinder shaped guide can be used to mark the desired needle position, the axis of which lies on the desired needle path, and an end of which can mark the desired position of the needle tip if this position is on the surface or close to the surface. It may also mark the needle entry point into the object. If this guiding cylinder is rendered solid (or semi-transparent), the guiding cylinder will occlude the needle in a way that is independent of whether the needle is closer to or farther from the observer's vantage point. This is the occlusion problem: the wrong occlusion cues disturb the correct 3D perception.

To minimize the effect of the occlusion problem, the invention advantageously constructs guides according to the following principle: when the needle gets close to its desired position, guide and needle should not overlap significantly, if at all, in the augmented view. Rather than marking the correct position directly, the guide is framing the correct position. The path where the needle is supposed to be placed is "empty" in the graphics guide. When the needle is placed in the correct position, guiding graphics and needle appear side by side, avoiding occlusion that disturbs depth perception.

Figure 3:
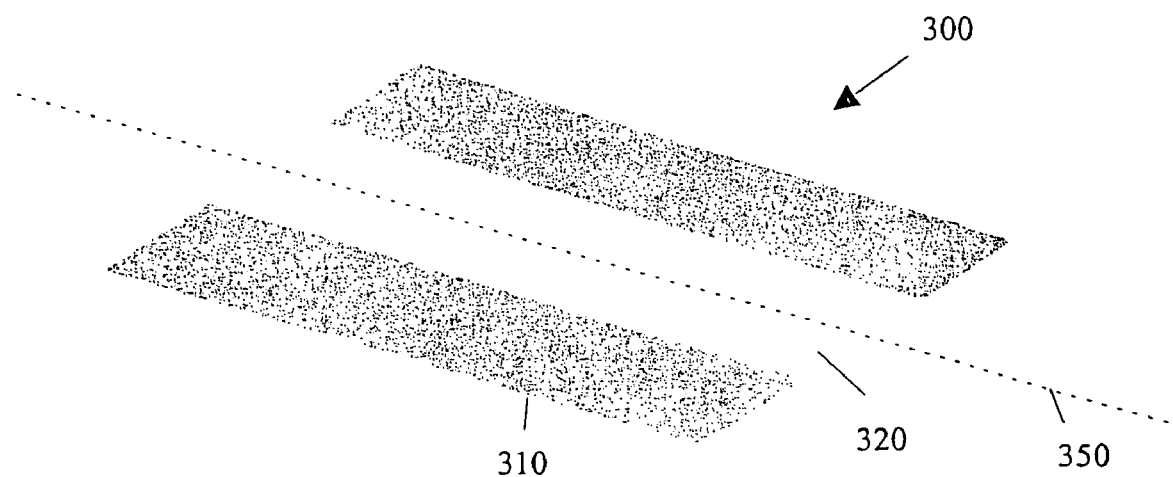
FIG. 3 is a diagram illustrating a graphics guide 300 for augmented reality guided positioning of a needle, according to an illustrative embodiment of the present invention.

FIG. 3 is a diagram illustrating a graphics guide 300 for augmented reality guided positioning of a needle, according to an illustrative embodiment of the present invention. The graphics guide 300 includes a rectangle 310 with a (transparent) window 320 that marks the needle path 350. It is to be appreciated that the graphics guide 300 could be rendered solid, half-transparent, textured, outlined, and so forth. The important feature in any of the preceding configurations is the transparent window 320 at the desired location of the needle. It is to be appreciated that while a rectangle is used in the embodiment of FIG. 3, any shape can be used to implement the graphic guides of the invention while maintaining the spirit and scope thereof. For example, polygons, circles, and so forth may be used a graphics guides according to the invention.

Figure 4:
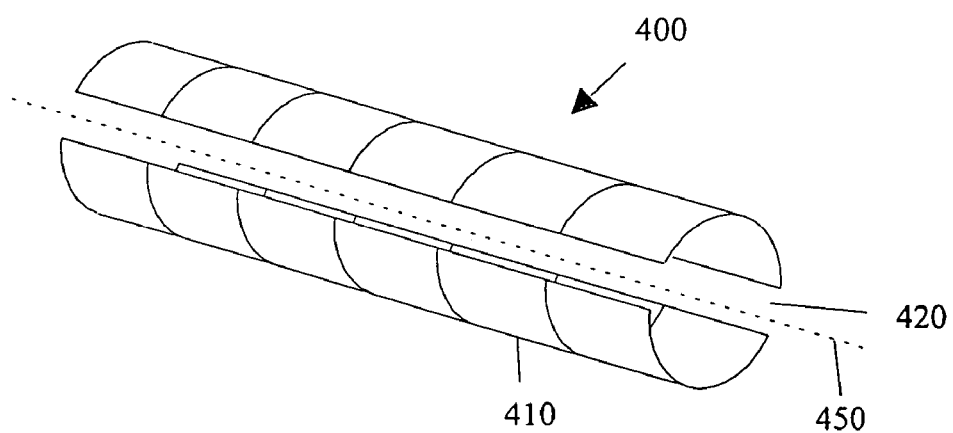
FIG. 4 is a diagram illustrating another graphics guide 400 for augmented reality guided positioning of a needle, according to another illustrative embodiment of the present invention.

FIG. 4 is a diagram illustrating another graphics guide 400 for augmented reality guided positioning of a needle, according to another illustrative embodiment of the present invention. The graphics guide 400 is derived from the cylindrical guide described above and includes a cylinder 410 with a (transparent) window 420 that marks the needle path 450. The rendering of only the surface of the cylinder 410 and the cutting out of the transparent window 420 along the axis through the cylinder 410 eliminates occlusion between the graphics guide 400 and the needle once the needle is aligned with the cylinder's axis.

Figure 5:
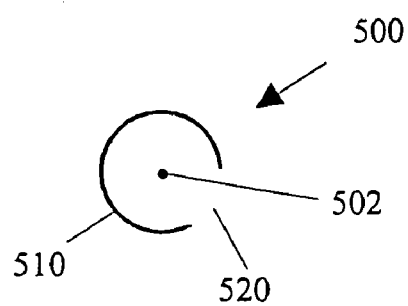
FIG. 5 is a diagram illustrating yet another graphics guide 500 for augmented reality guided positioning of an instrument, according to yet another illustrative embodiment of the present invention.

FIG. 5 is a diagram illustrating a graphics guide 500 for augmented reality guided positioning of an instrument, according to an illustrative embodiment of the present invention. In this example, the graphics guide marks a target 502 onto which the tip of an instrument should be placed (the instrument's orientation being arbitrary), according to yet another illustrative embodiment of the invention, e.g., a target on the object's surface, or an entry point of the needle. The graphics guide 500 includes a circle 510 having an opening 520 so as to resemble the letter C. The target 502 is framed by the circle 510 (preferably, but not necessarily, centered), and the outline of the circle 510 is broken (i.e., the opening 520) on the side where the tip of the needle is expected to enter the circle 510. For example, the outline of the circle 510 is broken on the lower right side when the user is right-handed, or on the lower left side when the user is left-handed. Thus, the opening may be used to specify a potential direction of approach or path 550 for the needle. Advantageously, the tip of the instrument can reach the target 502 without getting occluded by the graphics guide 500.

Figure 6:
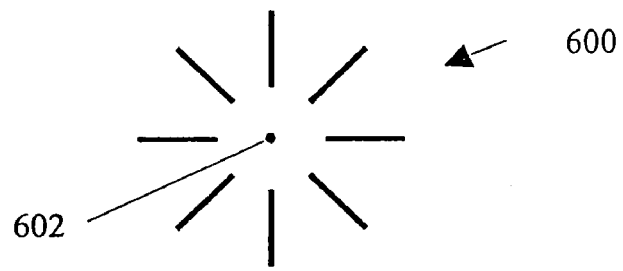
FIG. 6 is a diagram illustrating still another graphics guide 600 for augmented reality guided positioning of a needle, according to still another illustrative embodiment of the present invention.
Figure 6:
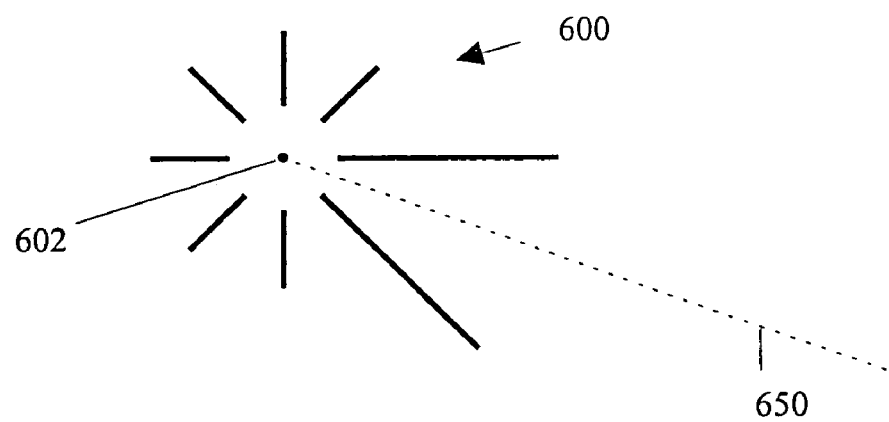

FIG. 6 is a diagram illustrating still another graphics guide 600 for augmented reality guided positioning of a needle, according to still another illustrative embodiment of the present invention. The graphics guide 600 includes a pattern of lines. The graphics guide 600 is preferably centered on the target 602 or, at the least, surrounds the target. The lines may be equally spaced (as shown) to allow an elongated member of pass through any two consecutive lines. Alternatively, at least two consecutive lines may be spaced differently from the remaining lines to frame a path 650 of the instrument to the target 602. It is to be appreciated that in the latter case the non-symmetrical spacing enables an observer to readily determine the path 650 to the target location.

A description of vantage point dependent graphics guides will now be given according to an illustrative embodiment of the present invention. It is to be appreciated that if the observer can assume a greater range of positions, it is advantageous to change the orientation of the graphics guides according to the observer's vantage point. For example, in the case of the windowed rectangle of FIG. 2, the windowed rectangle can be rotated around the axis of the needle path so that it keeps facing the user. In the case of the windowed cylinder of FIG. 3, the slit can be rotated so that the user keeps looking through the slit. The information required to adjust the graphics guides according to the user's vantage point is readily available as the vantage point is already being tracked for correct registration between virtual objects and the real scene.

It is to be appreciated that while a needle has been used as the instrument to be positioned in the examples of FIGS. 3-6, any type of instrument may be employed. For example, with respect to the graphic guides of FIGS. 3-6, the instrument may be any instrument that includes an elongated member such as, for example, a scalpel, a drill, and so forth. Given the teachings of the invention provided herein, one of ordinary skill in the related art will contemplate these and various other instruments to which the present invention may be applied.

Figure 7:
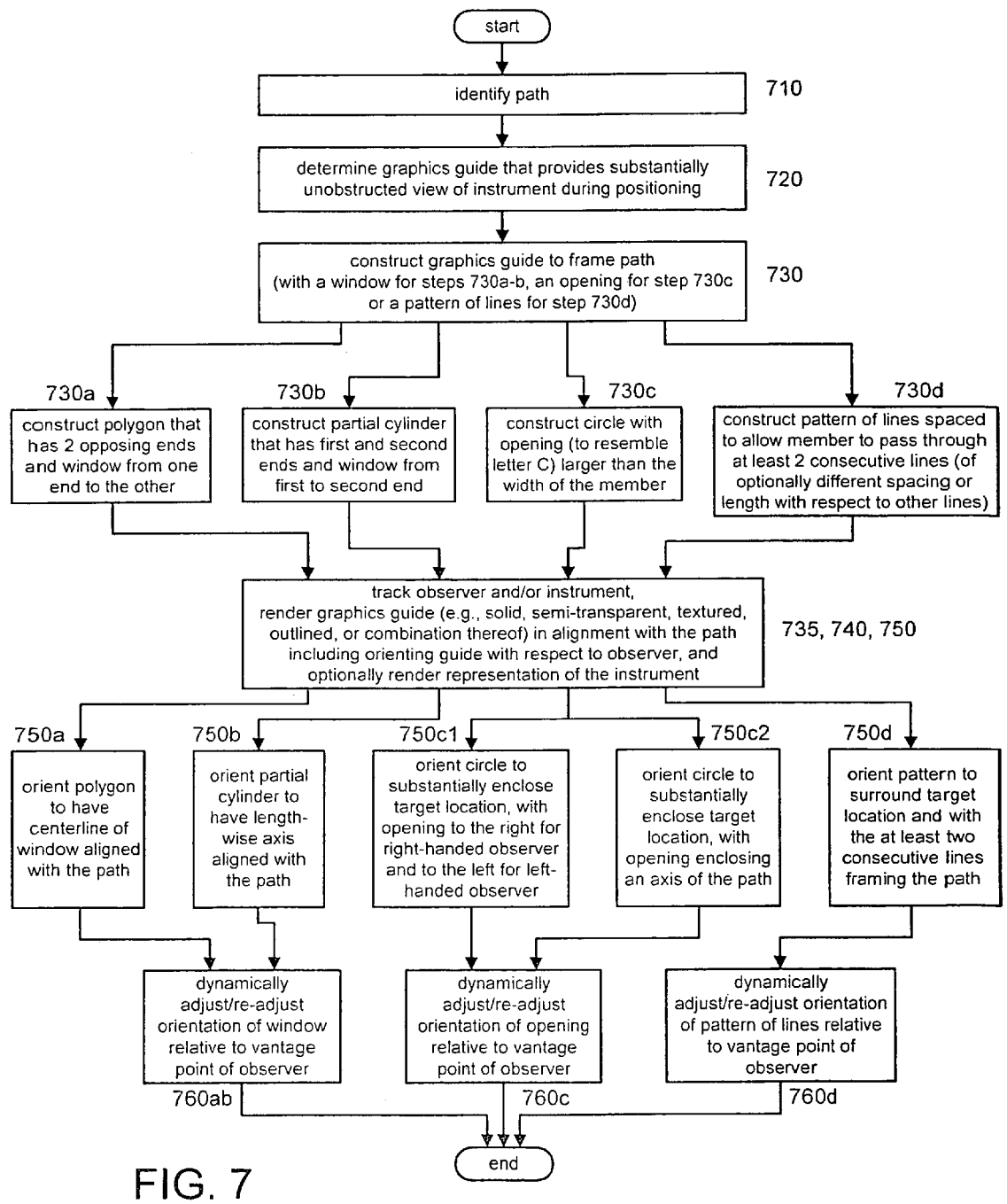
FIG. 7 is a flow diagram illustrating a method for augmented reality guided instrument positioning using graphics guides, according to an illustrative embodiment of the present invention.

FIG. 7 is a flow diagram illustrating a method for augmented reality guided instrument positioning using graphics guides, according to an illustrative embodiment of the present invention. In the illustrative embodiment of FIG. 7, the instrument includes an elongated member with a tip.

However, other instruments may be substituted therefore, while maintaining the spirit and scope of the invention.

A potential path to be traversed during a potential positioning of the instrument is identified as a predetermined path (step 710). A graphics guide for positioning the instrument is determined such that the graphics guide provides a substantially unobstructed view of the instrument during the positioning (step 720). For example, in the case of a drill, only the bit or the portion thereof that contacts a patient need be unobstructed; it is generally inconsequential if the drill housing is obstructed. That is, the invention provides for some or all of the contact/insertion medium of the instrument to be unobstructed, while the handle, housing, or other patient non-contact/non-insertion portion may or may not be obstructed. It is to be appreciated that, in some circumstances, there may be some occlusion of the contact/insertion medium during rough (initial) positioning of an instrument. For example, in the case of the cylinder of FIG. 4, a user (e.g., physician) may enter the needle into the cylinder through the sidewall of the cylinder, thereby temporarily occluding the needle; however, once the needle is within the cylinder, there is no occlusion of the needle by the cylinder (due to the window).

The graphics guide is constructed to frame the predetermined path (step 730). The predetermined path is framed with a window for steps 730a-b, an opening for step 730c, and a pattern of lines for step 730d. It is to be appreciated that the window may be transparent or semi-transparent. In the latter case, a shading scheme may be used such that it is clear at the centerline of the window but becomes increasingly shaded in directions perpendicular to the centerline of the window (with the centerline of the window aligned with the path).

With respect to step 730a, a polygon is constructed that includes two opposing ends and the window disposed from one of the two opposing ends to another one of the two opposing ends.

With respect to step 730b, a partial cylinder is constructed that has a first end and a second end and the window disposed from the first end to the second end along a length-wise axis of the partial cylinder.

With respect to step 730c, a circle is constructed that has an opening such that the circle resembles the letter C, and the opening is larger than a width of the elongated member.

With respect to step 730d, a pattern of lines is constructed such that at least two consecutive lines of the pattern of lines are spaced to allow the elongated member to pass through.

The observer and/or instrument are tracked (step 735), so that their pose with respect to the object(patient)/target can be determined. The graphics guide is rendered (e.g., solid, semi-transparent, textured, outlines, or a combination thereof) in alignment with the predetermined path to be traversed during the positioning of the instrument. (step 740). Step 740 includes orienting the graphics guide with respect to the observer (step 750). Such orientation is performed according to steps 750a, 750b, 750c, or 650d depending upon whether step 730a, 730b, 730c, or 730d was previously performed, respectively. Step 740 may optionally include rendering a representation of the instrument during the positioning to reveal an augmented reality spatial representation of the instrument with respect to the graphics guide.

With respect to step 750a, the polygon is oriented so that a centerline of the window is aligned with the predetermined path.

With respect to step 750b, the partial cylinder is oriented so as to have the length-wise axis of the cylinder aligned with the predetermined path.

With respect to step 750c1, the circle is oriented so as to substantially enclose the target location and the opening is one of to the right with respect to the observer when the observer is right-handed or to the left with respect to the observer when the observer is left-handed.

With respect to step 750c2, the circle is oriented such that the circle substantially encloses the target location and the opening encloses an axis of the at least one path.

With respect to step 750d, the pattern of lines is oriented to surround a target location of the elongated member, with the at least two consecutive lines framing the predetermined path. It is to be appreciated that in some embodiments of the invention the pattern of lines may simply be oriented to frame the target location irrespective of the path, when any two consecutive lines are spaced to allow the elongated member to pass therethrough. In other embodiments of the invention, the at least two lines that frame the path may be made longer than the remaining lines or have a different spacing than the remaining lines to indicate that the instrument is to travel therebetween.

Steps 750a or 750b may include the step of dynamically adjusting (or re-adjusting) the orientation of the windowed guide relative to the vantage point of the observer (step 760ab).

Steps 750c1 or 750c2 may include the step of dynamically adjusting (or re-adjusting) the orientation of the opening relative to the vantage point of the observer (step 760c).

Step 750d may include the step of dynamically adjusting (or re-adjusting) the orientation of the pattern of lines relative to the vantage point of the observer.

A description of modulated graphics guides for augmented reality guided instrument positioning will now be given according to an illustrative embodiment of the present invention.

To minimize the effect of the occlusion problem, the appearance of a graphics guide is modulated. Modulation means that the guides are not constructed as extended uniform objects. Rather, the transparency of the graphics guides (or portions thereof) are varied. The variation can be implemented spatially, temporally, or a combination thereof. For example, the variation can be in time with the guiding graphics (or portions thereof) fading in and out in the augmented image to repetitively permit an unobstructed view of the instrument at pre-defined intervals. The variation can also be in space with the graphics guides having high transparency regions that permit an unobstructed view of some or all of the instrument. The variation can also be both in space and in time, for example with high transparency regions moving across the graphics guides. Other possibilities for space and time variation are readily contemplated by one of ordinary skill in the art while maintaining the spirit and scope of the present invention.

Consider, for example, the case wherein the tip of the instrument needs to be placed onto a target with arbitrary orientation of the instrument, and a simple disc or ball shaped graphics object is used to mark the target. When the augmented view shows the marker overlapping with (and occluding) the tip of the instrument while the tip of the instrument is actually still in front of the target location, this wrong occlusion disturbs the correct 3D perception. A simple temporal modulation of the marker (i.e. varying its transparency so that it fades in and out) will reduce the negative impact of wrong occlusion.

Figure 8:
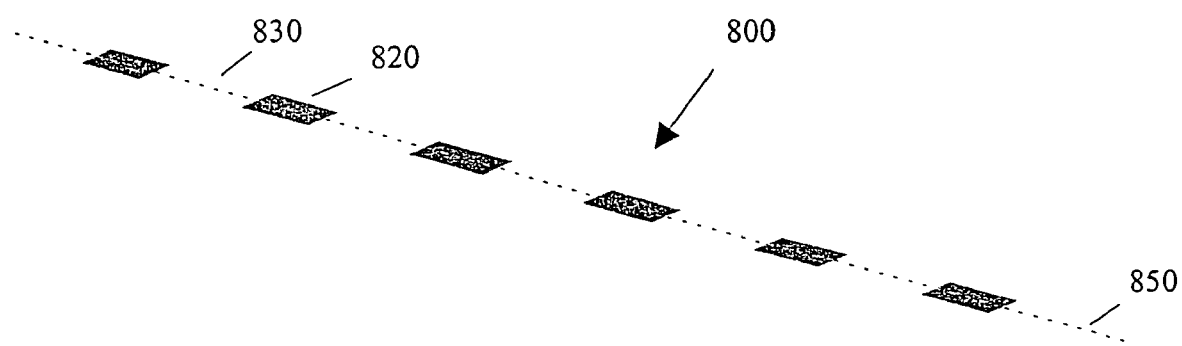
FIG. 8 is a diagram illustrating a modulated graphics guide 800 for augmented reality guided positioning of a needle, according to an illustrative embodiment of the present invention.

FIG. 8 is a diagram illustrating a modulated graphics guide 800 for augmented reality guided positioning of a needle, according to an illustrative embodiment of the present invention. The modulated graphics guide 800 includes a thick discontinuous line having a plurality of closed segments 820 and a plurality of open segments 830. The modulated graphics guide 800 is aligned with the desired path 850 for the needle to travel to the target. It is to be appreciated that the modulated graphics guide could be rendered solid, half-transparent, textured, outlined, and so forth. The important feature of the graphics guide of FIG. 8 is the modulation (here spatial) that permits a substantially unobstructed view of the needle through the open segments 830. It is to be further appreciated that the transition between the space segments (open segments 830) and the line segments (closed segments 820) needs not be abrupt as shown but could be a smooth transparency transition over an extended distance. Additional temporal modulation could make the line segments (closed segments 820) fade in and out, could make the spaces (open segments 830) fade in and out, could make the spaces move along the line, switch transparencies between different regions of the line, and so forth. In a purely temporal modulation, the whole line (without open segments 820) would fade in and out.

Figure 9:
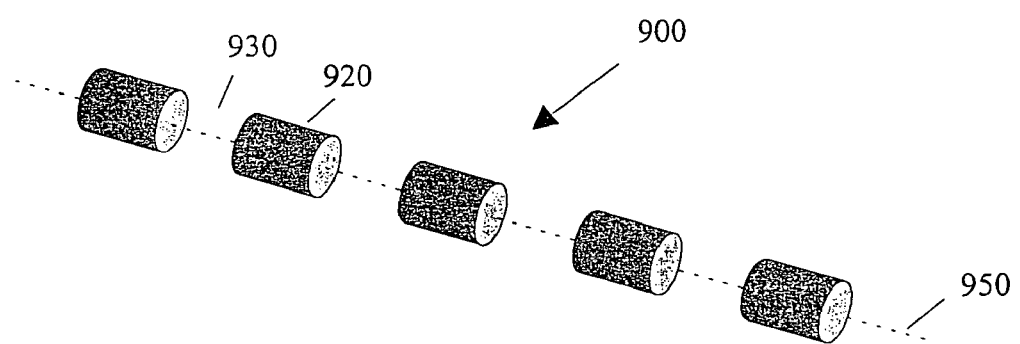
FIG. 9 is a diagram illustrating another modulated graphics guide 900 for augmented reality guided positioning of a needle, according to another illustrative embodiment of the present invention.

FIG. 9 is a diagram illustrating another modulated graphics guide 900 for augmented reality guided positioning of a needle, according to another illustrative embodiment of the present invention. The modulated graphics guide 900 includes a discontinuous cylinder having a plurality of closed segments 920 and a plurality of open segments 930. An axis of the cylinder is preferably centered or, at the least, surrounds a desired path 950. The plurality of open segments 930 are cut out of the cylindrical guide to eliminate occlusion between the guide and the needle in these high transparency gaps. As in the example of FIG. 8, different renderings of the cylinder segments (closed segments 820, open segments 830) are possible, as well as different ways of combining temporal and spatial modulation. In a purely temporal modulation, the whole cylinder would fade in and out.

Figure 10:
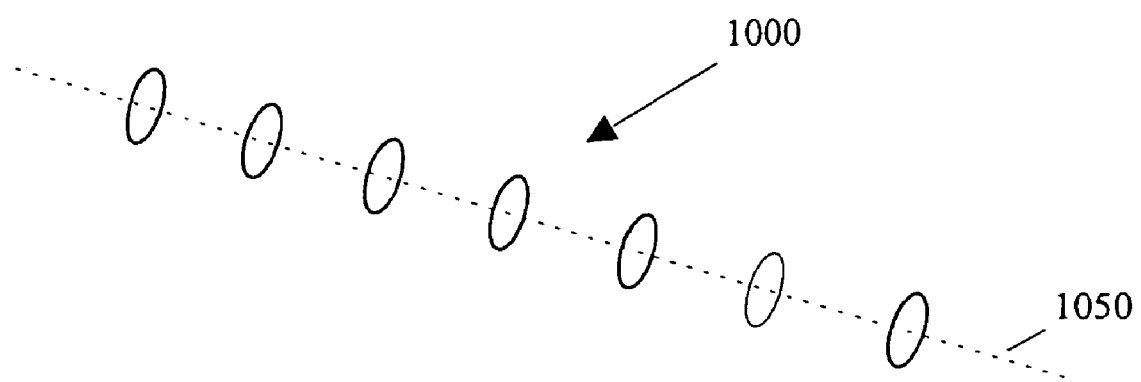
FIG. 10 is a diagram illustrating yet another modulated graphics guide 1000 for augmented reality guided positioning of a needle, according to yet another illustrative embodiment of the present invention.

FIG. 10 is a diagram illustrating yet another modulated graphics guide 1000 for augmented reality guided positioning of a needle, according to yet another illustrative embodiment of the present invention. The modulated graphics guide 1000 represents an extreme case of spatial modulation of the cylindrical graphics guide 900 of FIG. 9. Only a set of circles is depicted, distributed along and centered on the desired needle path 1050. In general, most of the graphics guides described herein may be rendered as sparse wireframes, particularly those graphics guides which are modulated according to the present invention.

It is to be appreciated that temporally modulated guiding graphics advantageously have the added benefit of drawing attention to themselves, by differentiating themselves from an otherwise stationary scene. Thus, temporally modulated guides are easy for a user to locate with respect to the background.

Figure 11A:
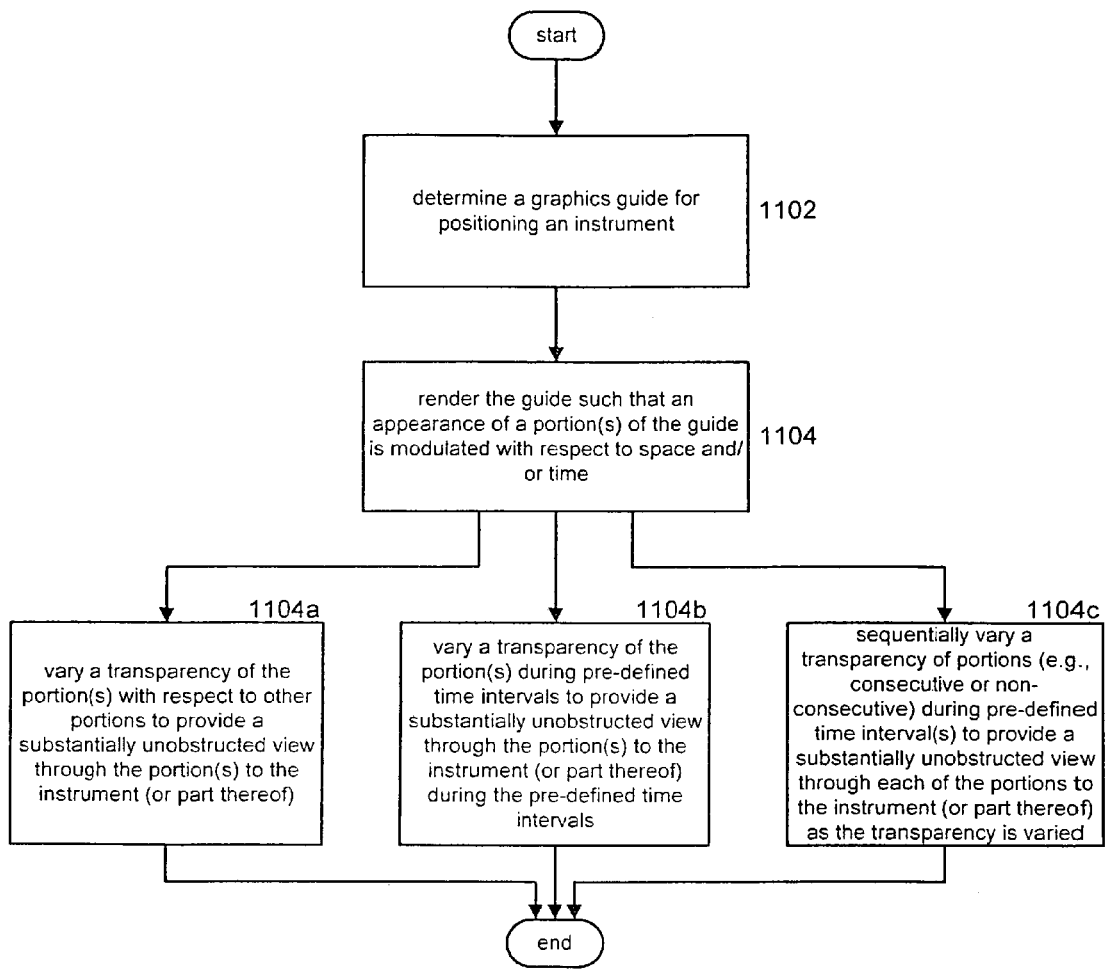
FIG. 11A is a flow diagram illustrating a method for augmented reality guided instrument positioning using modulated graphics guides, according to an illustrative embodiment of the present invention.

FIG. 11A is a flow diagram illustrating a method for augmented reality guided instrument positioning using modulated graphics guides, according to an illustrative embodiment of the present invention. A graphics guide for positioning an instrument is determined (step 1102). The graphics guide is rendered such that an appearance of at least one portion of the graphics guide is modulated with respect to at least one of space and time (step 1104) Step 1104 may include any one of steps 1104a, 1104b, and 1104c.

With respect to step 1104a, the rendering step includes the step of varying a transparency of the at least one portion of the graphics guide with respect to other portions of the graphics guide to provide a substantially unobstructed view through the at least one portion of the graphics guide to at least a portion of the instrument.

With respect to step 1104b, the rendering step includes the step of varying a transparency of the at least one portion of the graphics guide during pre-defined time intervals to provide a substantially unobstructed view through the at least one portion of the graphics guide to at least a portion of the instrument during the pre-defined time intervals.

With respect to step 1104c, the rendering step includes the step of sequentially varying a transparency of each of a plurality of portions (e.g., consecutive or non-consecutive portions) of the graphics guide during at least one pre-defined time interval to provide a substantially unobstructed view through each of the plurality of portions to at least a portion of the instrument as the transparency of each of the plurality of portions is varied during the at least one pre-defined time interval.

Figure 11B:
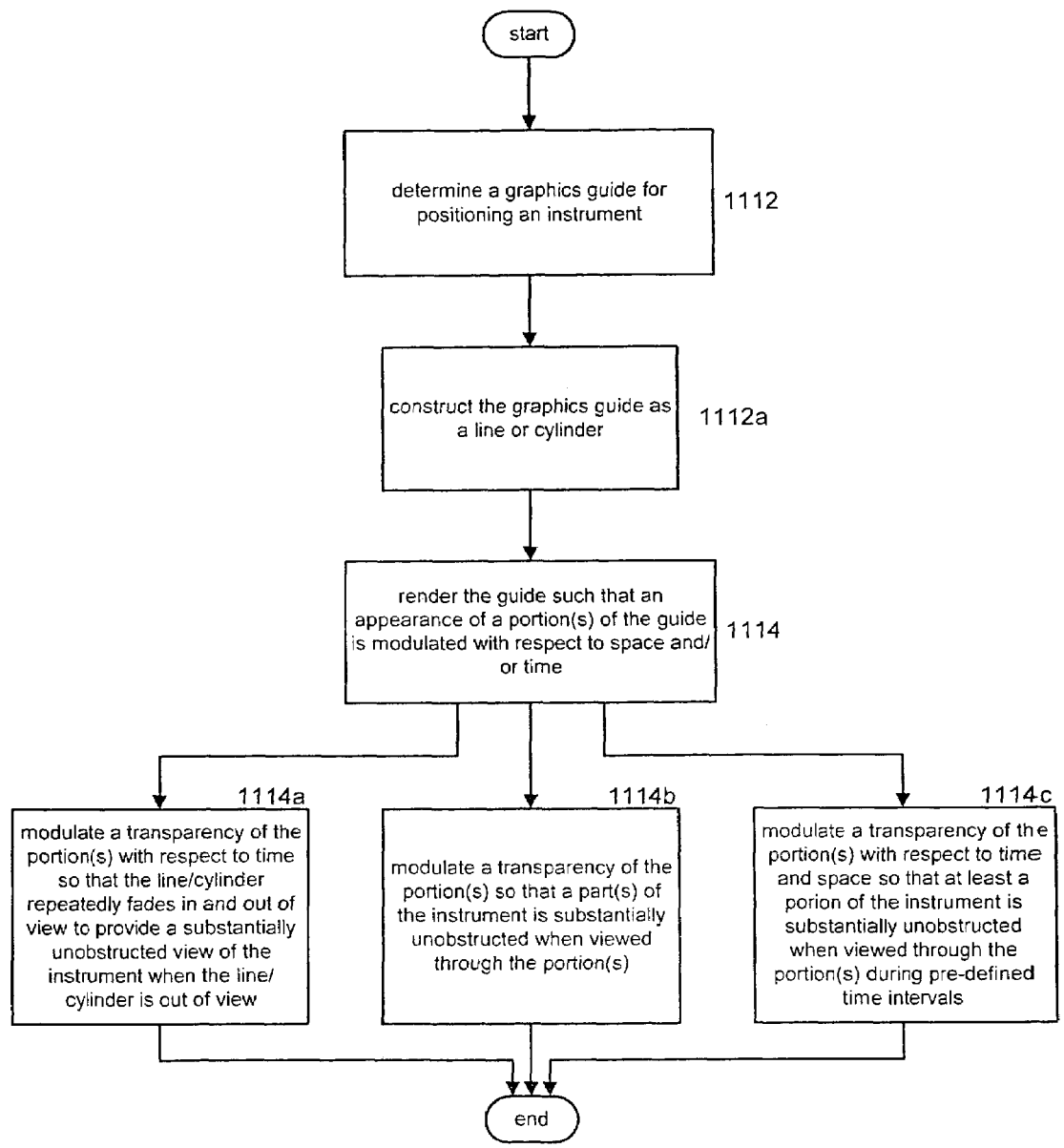
FIG. 11B is a flow diagram illustrating another method for augmented reality guided instrument positioning using modulated graphics guides, according to another illustrative embodiment of the present invention.

FIG. 11B is a flow diagram illustrating another method for augmented reality guided instrument positioning using modulated graphics guides, according to another illustrative embodiment of the present invention. A graphics guide for positioning an instrument is determined (step 1112). Step 1112 includes step 1112a, which constructs the graphics guide as a line or a cylinder.

The graphics guide is rendered such that an appearance of at least one portion of the graphics guide is modulated with respect to at least one of space and time (step 1114) Step 1114 may include any one of steps 1114a, 1114b, and 1114c.

With respect to step 1114a, the rendering step includes the step of modulating a transparency of the line/cylinder with respect to time so that the line/cylinder repeatedly fades in and out of view to provide a substantially unobstructed view of the instrument when the line/cylinder is out of view.

With respect to step 1114b, the rendering step includes the step of modulating a transparency of portions of the line/cylinder so that at least a portion of the instrument is substantially unobstructed when viewed through the portions of the line/cylinder.

With respect to step 1114c, the rendering step includes the step of modulating a transparency of portions of the line/cylinder with respect to time and space so that at least a portion of the instrument is substantially unobstructed when viewed through the portions of the line/cylinder during pre-defined time intervals.

A description of graphics guides for use in a "bull's eye" or "down-the-beam" approach to augmented reality guided instrument positioning will now be given according to an illustrative embodiment of the invention. In the bull's eye method for augmented reality guided instrument placement, a user has an augmented view where the object and instrument are part of the real scene and a graphic target and/or a graphic guide are augmenting graphics. It is to be appreciated that the graphic target is registered with respect to the real target. The user assumes a viewpoint so that he or she looks along the desired path towards the target. The user places the instrument so that it lines up with the path. In the case of an elongated instrument such as a needle, correct alignment is achieved when the entire length of the instrument is seen as a dot (bull's eye) at the center of the target. Additional graphics for guidance (e.g., graphics path markers and instrument axis markers (hereinafter also referred to as "axis markers") as described below) can be inserted in the augmented view to aid the user with the alignment.

The "bull's eye" or "down-the-beam" alignment method has been used in fluoro-guided medical procedures, e.g. fluoro-guided insertion of guide pins for pedicular bolts as described by Gennarelli et al., in "Minimally Invasive Techniques in Spinal Surgery: Current Practice", Neurosurg Focus 4 (2): Article 8, 1998. In a fluoro-guided procedure, the physician uses X-rays to check the alignment between instrument and target. In augmented reality guided instrument placement, the physician has "virtual X-ray vision" by seeing internal structures or markers superimposed on his real view of the patient. The superimposition is registered such that a model of a tumor (or a corresponding marker) appears at the actual location of the tumor. Whereas in a flouro-guided procedure both the target and the instrument are observed as structures on the same X-ray image, the augmented reality guidance shows a graphical representation of the target (or relevant portion thereof) and a "real" (optical or video) image of the instrument. As noted above, additional graphics for guidance can be inserted in the augmented view to aid the user with the alignment.

A brief description of some of the features and implementation considerations corresponding to the bull's eye or down-the-beam approach to augmented reality guided instrument positioning will now be given according to an illustrative embodiment of the invention. In one embodiment of the invention, the approach is implemented using a 2-step alignment process. First, the tip of the instrument is placed at the entry point. Then, the instrument is turned around it's tip to align the instrument with the desired path. Different graphics guides may be displayed for the different steps. Thus, in another embodiment, the user sees the target and an "alignable" instrument. An instrument is "alignable" when the user can look at the back end of the instrument and see that it lines up with his or her line of sight. That is, the user chooses a path by selecting a viewpoint when looking at the target, aligns the instrument with his or her line of sight towards the target, and inserts the instrument while keeping the alignment intact.

The display of the target alone is sufficient to align an instrument with a path towards target, when the instrument is alignable. However, in other embodiments of the invention, guides (graphics path guides) marking a particular path may be used, as well as markers on the instrument (instrument axis markers or axis markers). In the other embodiments, the user sees path guides that mark a predetermined path and an axis marker on the instrument for aligning with the predetermined path via the path guides. The axis markers may be part of the design of the instrument or may be added thereto. In the former case, the axis marker can either be a structure designed for the sole purpose of marking the instrument axis, or a structure designed to include the purpose of marking the instrument as well as having at least one other purpose, or the structure can be pre-existing and simply used as an axis marker.

It is to be appreciated that axis marker should be located at the end of the instrument (opposite from the front that is being inserted) that faces the viewer to facilitate alignment of the instrument with the path. For example, the axis of the instrument may be marked (axis marker) with a point or a circle that is to be aligned with a graphics guide. More sophisticated embodiments may include a mechanical structure(s) that enables one to check alignment along an observer's line of sight. We call such an instrument "alignable". For example, a ring may be placed around the instrument's axis with a central pin sticking out along the axis. Other structures may be used, such as, for example, structures that are similar to aiming aids on guns. Thus, in general, an axis marker is marker at the back-end of an instrument that marks the instrument's axis. Preferably, the axis marker is protruding member. However, other structures may be used such as, for example, a circle or cross that is centered on the instrument's axis, and so forth.

When the user wears a head-mounted display that gives him a variable viewpoint, a fixed path guide forces him to "stick" to that path and not stray off to a wrong instrument orientation due to an unnoticed shift in his viewpoint (in flouro-guided procedures, the X-ray flouro machine's viewpoint is fixed during the bull's eye instrument alignment).

Preferably, graphic path guides are designed as (hollow) cylindrical structures. Rings around the axis (i.e. the desired path), or lines parallel to the axis may also be employed for graphic path guides. However, it is to be appreciated that any shape or structure may be used to mark the path while maintaining the spirit and scope of the present invention.

It is also preferable that the design of the graphics guides is adapted to the shape of the instrument. If an instrument is thicker (and unstructured) at the end that faces the viewer, then the guides should mark a circumference around the path large enough that the instrument can be seen inside the guiding structure.

While any of the different types of graphics guides described herein may be combined, the bull's eye approach to augmented reality guided instrument positioning is amenable to the use of a depth marker to determine the correct depth of insertion of an instrument. A depth marker may be placed outside of the object, so that the correct depth of insertion is reached when a corresponding marker on the (external part) instrument lines up with the depth marker.

Figure 12:
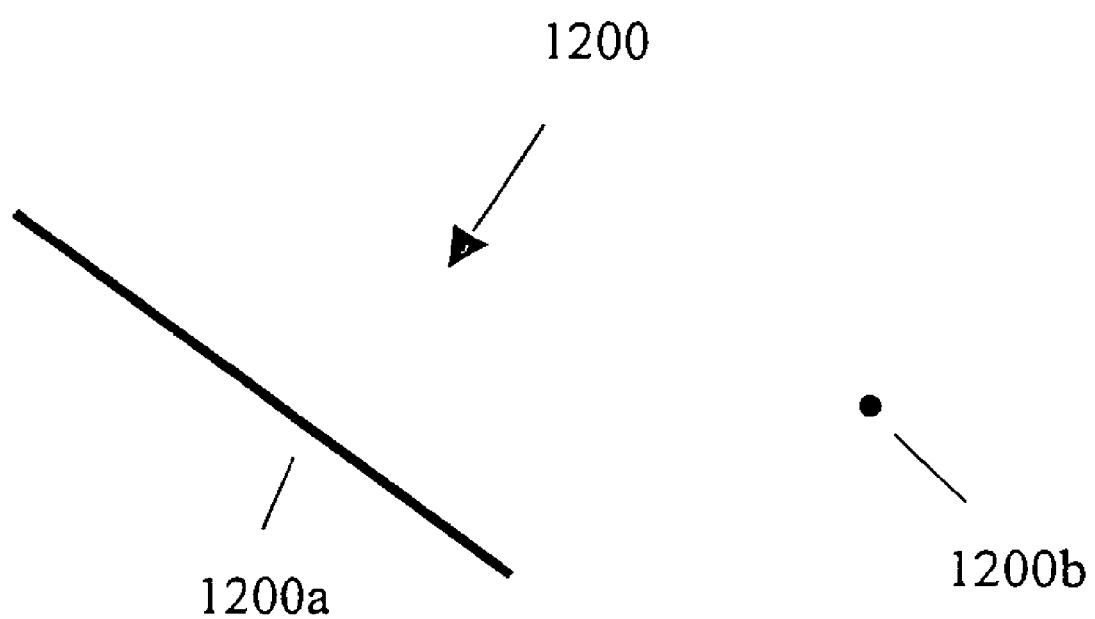
FIG. 12 is a simplified diagram illustrating a needle 120 before and after being placed in alignment with an observer's line of sight, according to an illustrative embodiment of the present invention.

FIG. 12 is a simplified diagram illustrating a needle 120 before and after being placed in alignment with an observer's line of sight, according to an illustrative embodiment of the present invention. Before the needle 1200 is aligned, i.e., when the needle 1200 is not aligned with the observer's line of sight, the needle 1200 appears as a line 1200a. In contrast, after the needle 1200 is aligned with the observer's line of sight, the needle 1200 appears as a point or a dot 1200b.

Figure 13:
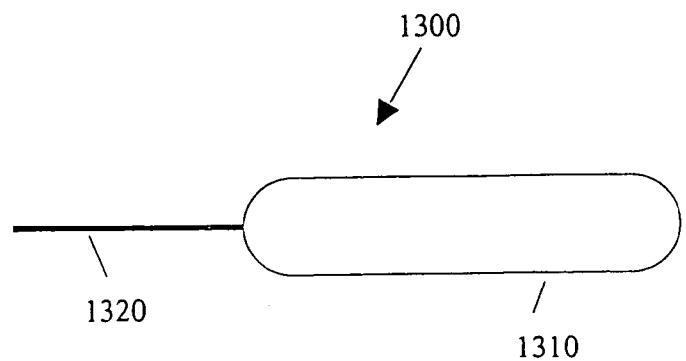
FIG. 13 is a diagram illustrating a conventional instrument 1300 having a structure that renders the instrument 1300 "not alignable"

FIG. 13 is a diagram illustrating a conventional instrument 1300 having a structure that renders the instrument 1300 "not alignable". The instrument 1300 is comprised of a thick handle 1310 with a thin elongated member 1320 protruding from an end thereof. The instrument 1300 is not alignable due to the big handle 1310 that hides the elongated member 1320 that is to be inserted into the object when viewed from the back of the instrument 1300. However, it is to be appreciated that an instrument may be designed to be alignable.

Figure 14:
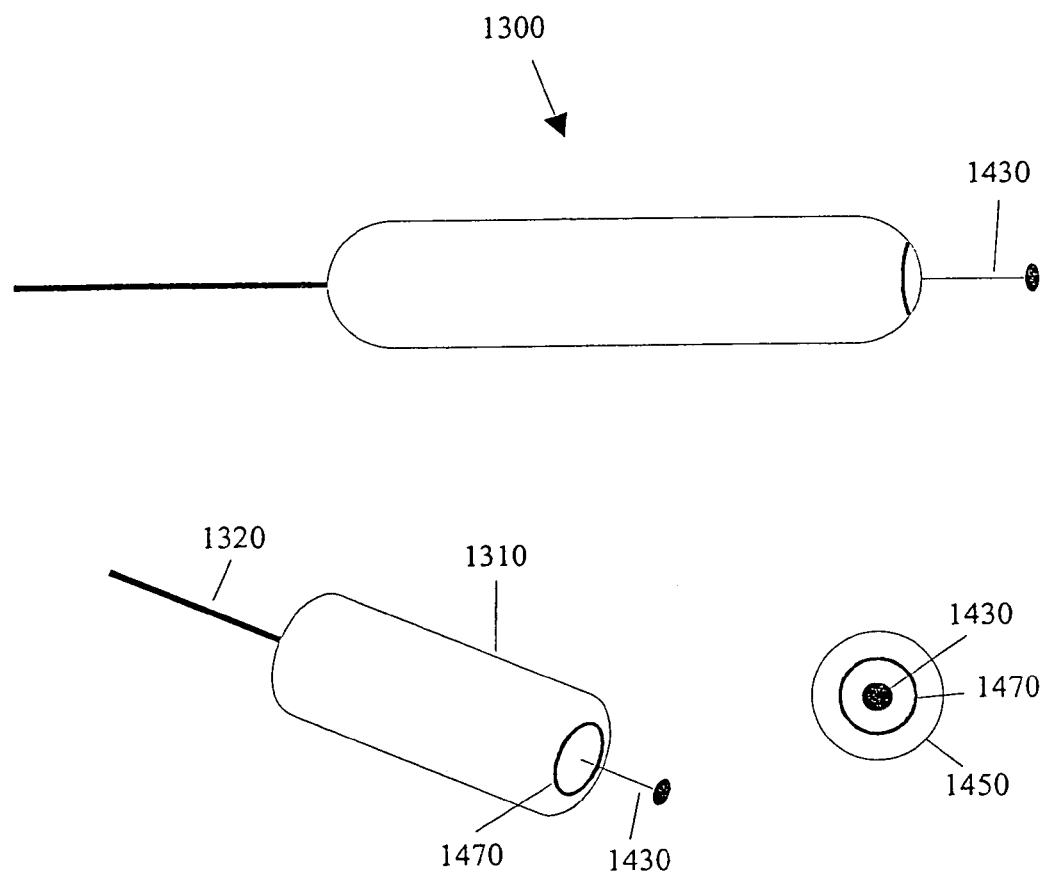
FIG. 14 is a diagram illustrating various views of the instrument 1300 of FIG. 13, with a marker 1430 located thereon according to an illustrative embodiment of the present invention.

FIG. 14 is a diagram illustrating various views of the instrument 1300 of FIG. 13, with a marker 1430 located thereon according to an illustrative embodiment of the present invention. The marker is placed on the instrument by either the design of the instrument or modification of an existing design. The marker 1430 is a protruding member that projects from the rear portion of the handle 1310 along the lengthwise axis of the instrument 1300. In this example, it is to be appreciated that the outer surface of the instrument 1300, when viewed from the back, resembles a ring 1450. Moreover, a graphics marker 1470 such as a circle may be used to align the instrument such that a bull's eye is seen when the instrument 1300 is aligned, the bull's eye resulting from the protruding member 1430 being centered in the graphics marker circle 1470 which is also centered in the ring 1450 formed by the outer surface of the instrument 1300.

Figure 15:
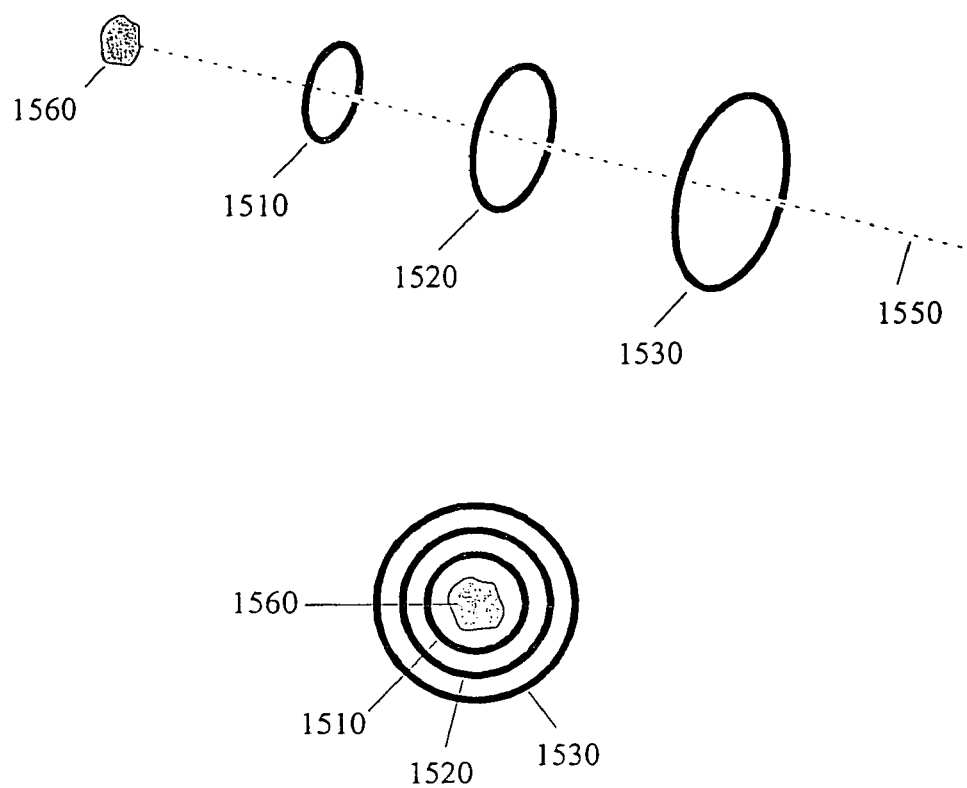
FIG. 15 is a diagram illustrating graphics path guides 1510, 1520, and 1530 for indicating a path 1550 for an instrument to follow to a target 1560, according to an illustrative embodiment of the present invention.

FIG. 15 is a diagram illustrating graphics path guides 1510, 1520, and 1530 for indicating a path 1550 for an instrument to follow to a target 1560, according to an illustrative embodiment of the present invention. In this example, the graphics path guides 1510, 1520, and 1530 are circles centered on and distributed along the path. Of course, other graphic structures may be used, while maintaining the spirit and scope of the invention.

Figure 16:
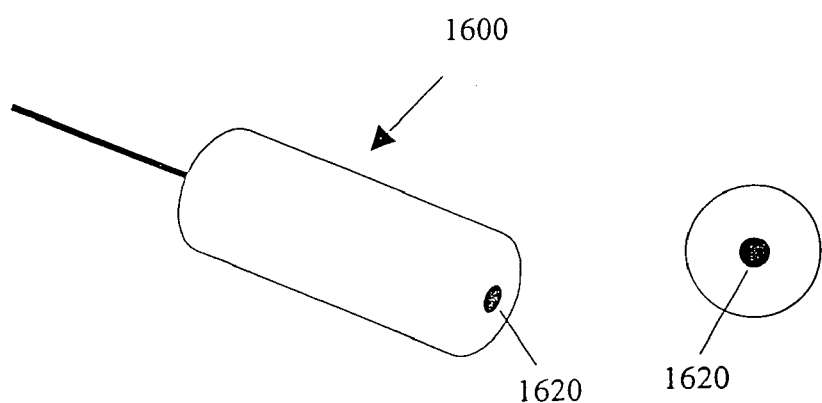
FIG. 16 is a diagram illustrating side and rear views of an instrument 1600 having an axis marker 1620, according to an illustrative embodiment of the present invention.

FIG. 16 is a diagram illustrating side and rear views of an instrument 1600 having an axis marker 1620, according to an illustrative embodiment of the present invention. While the axis marker 1620 is not visible in the side view, the axis marker 1620 is clearly visible in the rear view. In this case, the axis marker 1620 is a circle or dot.

Figure 17A:
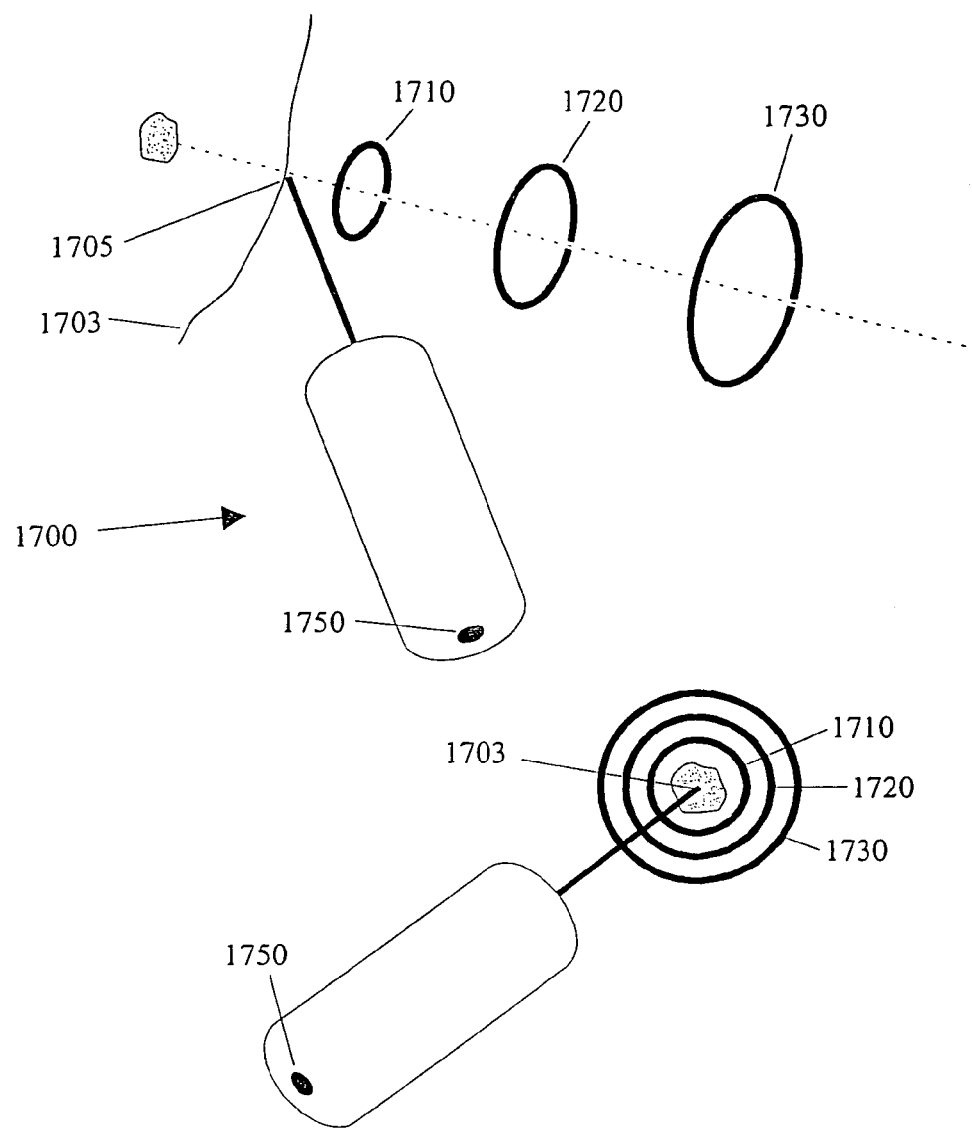
FIG. 17 is a diagram illustrating graphics path markers 1710, 1720, and 1730 and an axis marker 1750 for an instrument 1700, according to an illustrative embodiment of the present invention.
Figure 17B:
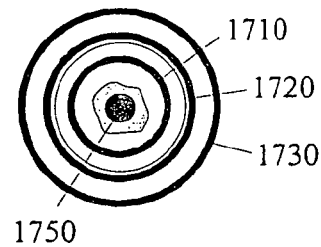

FIGS. 17A-B are diagrams illustrating graphics path markers 1710, 1720, and 1730 and an axis marker 1750 for an instrument 1700, according to an illustrative embodiment of the present invention. In this case, the user first holds the instrument 1700 in a tilted fashion and aligns the tip 1705 of the instrument 1700 with an entry point on the object's surface 1703, guided by the path markers 1710, 1720, and 1730 (FIG. 17A). Then, the user swivels the instrument 1700 around its tip 1705 to align the back end of the instrument 1700 with the path markers (FIG. 17B). Thus, the instrument does not have to be "alignable" by itself.

Figure 18A:
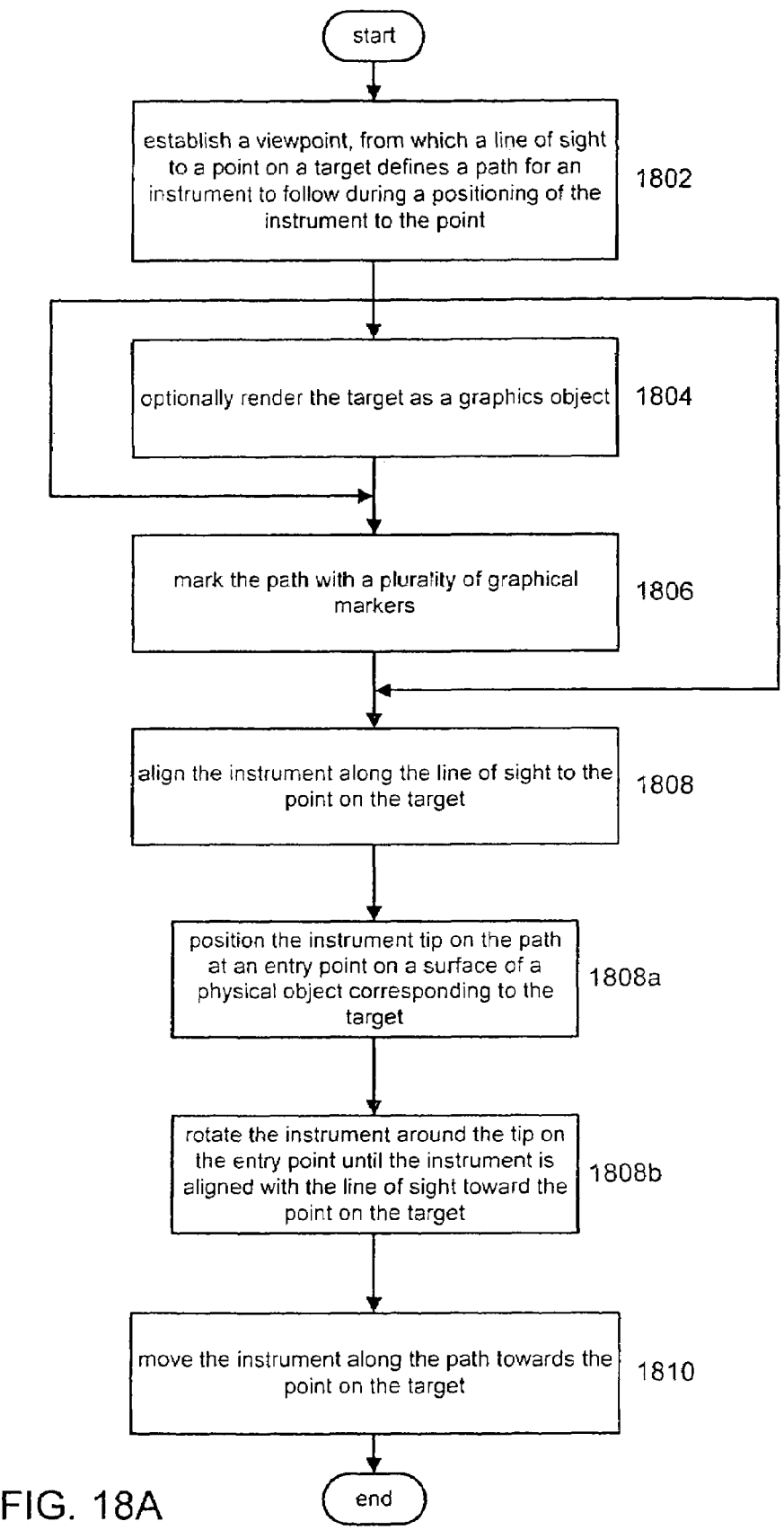
FIG. 18A is a flow diagram illustrating a method for augmented reality guided positioning of an instrument using a bull's eye alignment approach, according to an illustrative embodiment of the present invention.

FIG. 18A is a flow diagram illustrating a method for augmented reality guided positioning of an instrument using a bull's eye alignment approach, according to an illustrative embodiment of the present invention. A viewpoint is established, from which a line of sight to a point on a target defines a path for an instrument to follow during a positioning of the instrument to the point on the target (step 1802).

From step 1802, it is to be appreciated that the method of FIG. 18 may proceed to any of steps 1804, 1806, and 1808. However, it is to be further appreciated that one of steps 1804 and 1806 may be skipped.

At step 1804, the target may optionally be rendered as a graphics object. At step 1806, the path is marked with a plurality of graphical markers. At step 1808, the instrument is aligned along the line of sight to the point on the target.

Step 1808 includes steps 1808a and 1808b. With respect to step 1808a, the tip of the instrument is positioned on the path, at an entry point on a surface of a physical object (e.g., patient) corresponding to the target. With respect to step 1808b, the instrument is rotated around the tip on the entry point until the instrument is aligned with the line of sight toward the point on the target.

The instrument is moved along the path towards the point on the target, subsequent to the aligning step(s) (step 1810).

Figure 18B:
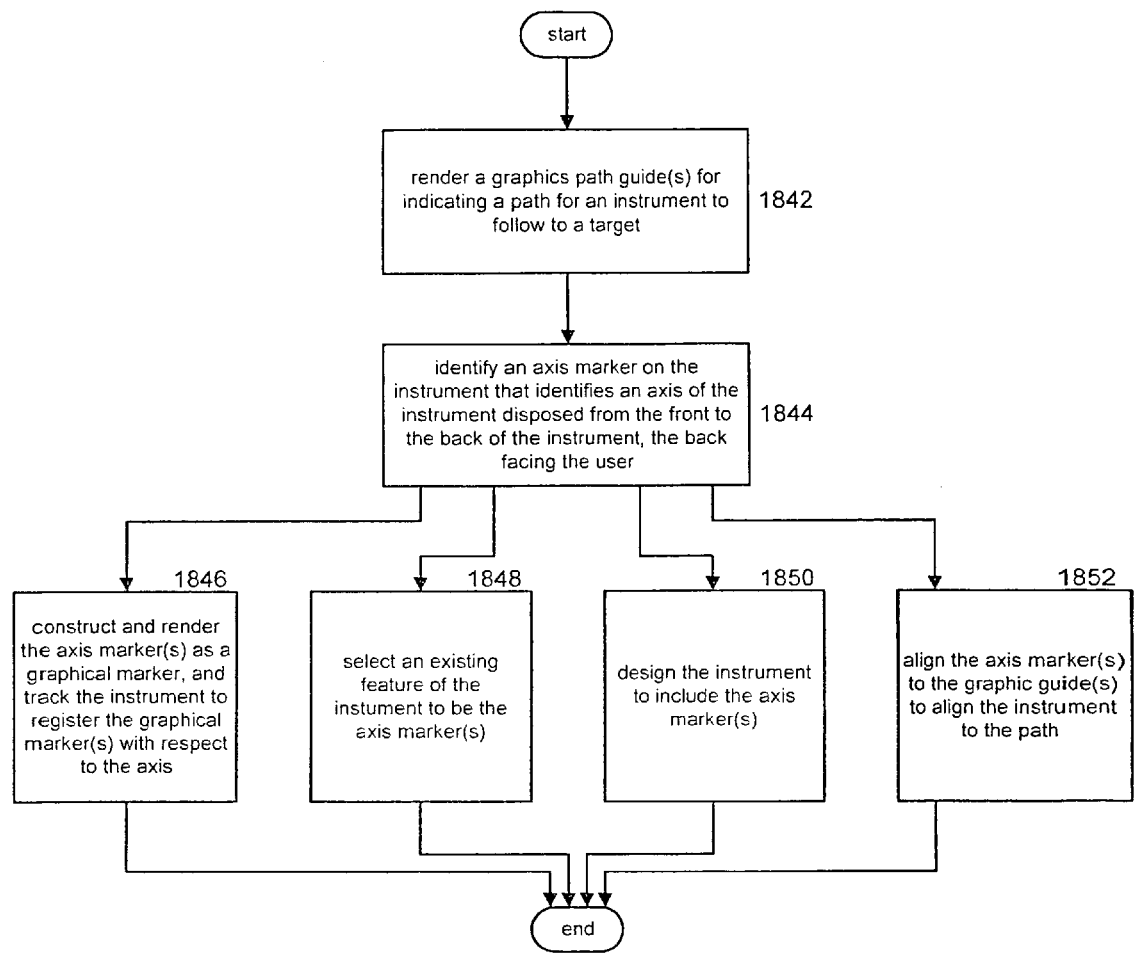
FIG. 18B is a flow diagram illustrating another method for augmented reality guided positioning of an instrument using a bull's eye alignment approach, according to another illustrative embodiment of the present invention.

FIG. 18B is a flow diagram illustrating another method for augmented reality guided positioning of an instrument, according to another illustrative embodiment of the present invention. At least one graphics path guide is rendered for indicating a path for an instrument to follow to a target (step 1842). At least one axis marker on the instrument is identified that marks an axis of the instrument (step 1844). The axis is disposed from the front portion to the back portion of the instrument, the front portion corresponding to the point on the target, and the back portion facing a user.

From step 1844, the method of FIG. 18B may continue to any one of steps 1846, 1848, 1850, and 1852.

With respect to step 1846, the at least one axis marker is constructed and rendered as a graphical marker, and the instrument is tracked to register the graphical marker with respect to the axis of the instrument.

With respect to step 1848, an existing feature of the instrument is selected to be the at least one axis marker.

With respect to step 1850, the instrument is designed to include the at least one axis marker.

With respect to step 1852, the at least one axis marker is added to a structure of the instrument.

The at least one axis marker is then aligned with respect to the at least one graphics guide to align the instrument to the path (step 1854).

With respect to line-of-sight guided positioning of an instrument, a description of display options corresponding thereto will now be given according o an illustrative embodiment of the present invention. The user may wear a head-mounted display of the optical-see-through variety, or of the video-see-through variety with head-mounted camera. The video camera (or video cameras) can also be externally mounted in a way that it can be aligned with a chosen path and fixed in that pose, with the augmented view displayed on a monitor.

A description of virtual line-of-sight guided positioning of an instrument according to an illustrative embodiment of the present invention will now be given. In this approach, the instrument is tracked. The pose of the instrument is known and is in the same coordinate system in which we know the location of the target. A graphical representation of both the target and the instrument can be rendered from an arbitrary virtual viewpoint.

To perform an instrument-to-target alignment, we can be guided completely by this virtual scene that shows the geometric relationship between the locations of the target and the instrument. A virtual bull's eye view is very helpful and intuitive to perform the alignment.

Before, the user was provided with an augmented view of the real scene so that the chosen path of instrument positioning was along the line-of-sight towards the target.

Now, the user is being provided with a virtual view for which the line-of-sight towards the target is aligned with a chosen path of the instrument positioning. The virtual view shows a graphical representation of the target ("virtual target") and a graphical representation of the instrument ("virtual instrument").

Figure 19:
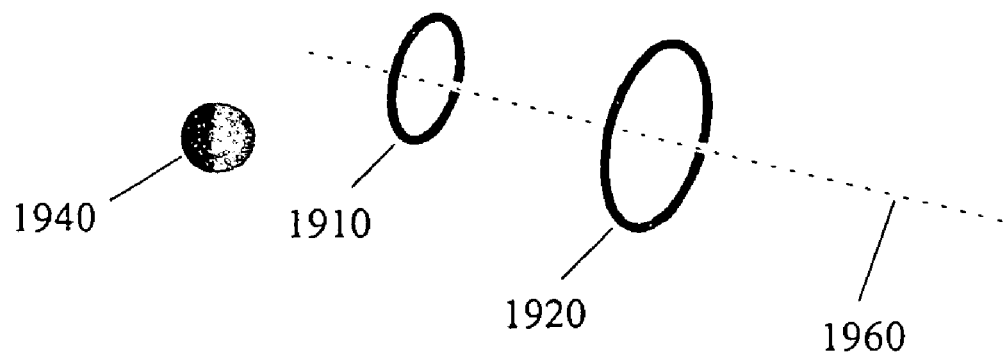
FIG. 19 is a diagram illustrating a graphics instrument guide (virtual instrument) 1910 and 1920 and a graphics target guide (virtual target) 1940 for virtual line-of-sight guided positioning of an instrument according to an illustrative embodiment of the present invention.
Figure 19:
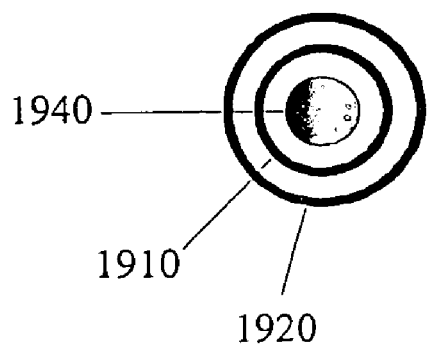

FIG. 19 is a diagram illustrating a graphics instrument guide (virtual instrument) 1910 and 1920 and a graphics target guide (virtual target) 1940 for virtual line-of-sight guided positioning of an instrument according to an illustrative embodiment of the present invention. A point on the actual target is rendered as a graphics target guide 1940 illustrated as a disc, and the instrument is marked by a graphics instrument guides 1910 and 1920 consisting of two rings centered on the instrument's axis 1960 and located at different positions along the instrument's axis 1960. Two different views are shown in FIG. 19, one for the case when the graphics instrument guide 1910 and 1920 is not aligned with the graphics target guide 1940 and the other case when the graphics instrument guide 1940 is aligned with the graphics target guide 1940.

Figure 20:
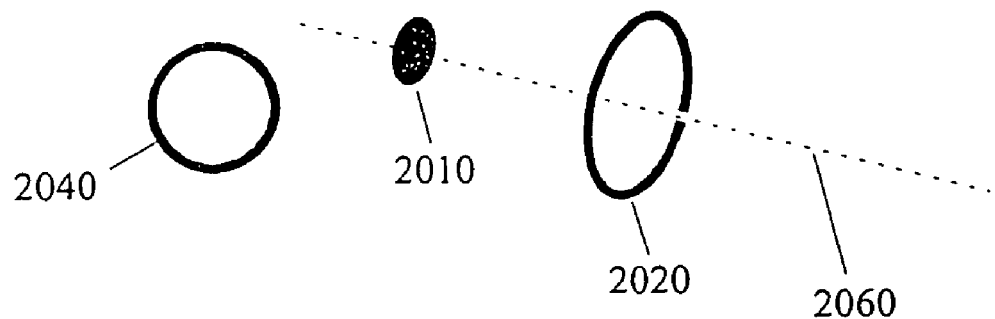
FIG. 20 is a diagram illustrating another graphics instrument guide (virtual instrument) 2010 and 2020 and another graphics target guide (virtual target) 2040 for virtual line-of-sight guided positioning of an instrument according to another illustrative embodiment of the present invention.
Figure 20:
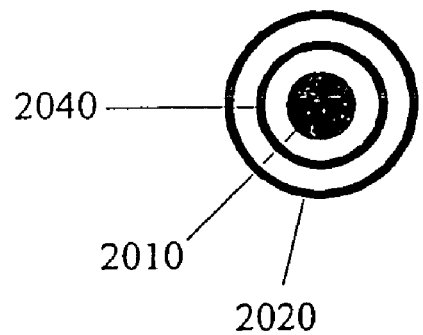

FIG. 20 is a diagram illustrating another graphics instrument guide 2010 and 2020 and another graphics target guide 2040 for virtual line-of-sight guided positioning of an instrument according to another illustrative embodiment of the present invention. The actual target is marked with a graphics target guide 2040 consisting of a ring, and the instrument is marked with graphics instrument guides 2010 and 2020 consisting of a disc and a ring, both centered on the instrument's axis 2060 and located at different positions along instrument's axis 2060. Two different views are shown in FIG. 20, one for the case when the graphics instrument guide 2010 and 2020 is not aligned with the graphics target guide 2040 and the other case when the graphics instrument guide 2040 is aligned with the graphics target guide 2040.

With respect to virtual line-of-sight guided positioning of an instrument, a description of adaptive rotation of a virtual view around a path will now be give according to an illustrative embodiment of the present invention. To make alignment of the instrument (guided by the virtual view along the path) most intuitive, the virtual view should be presented to the user in an orientation such that if the user moves the rear end of the instrument to the left, the graphics representation of the instrument should show the instrument's rear end moving to the left. The same is true for the cases of moving right, forward, backward, and so forth. If the user's position is variable, the system may adapt the orientation of the virtual down-the-path view.

With respect to virtual line-of-sight guided positioning of an instrument, a description of the combination of a side view and a bull's eye view will now be given according to an illustrative embodiment of the present invention. Besides a virtual down-the-path view, the user may also be provided with a side view of the scene, virtual or augmented. The side view helps to control the movement of the instrument along its way towards the target (depth of instrument insertion).

With respect to virtual line-of-sight guided positioning of an instrument, a description of the integration of depth information into a virtual along the path view will be given. Information about the forward movement of the instrument along the path towards the target can be integrated into the virtual down-the-path view.

Figure 21:
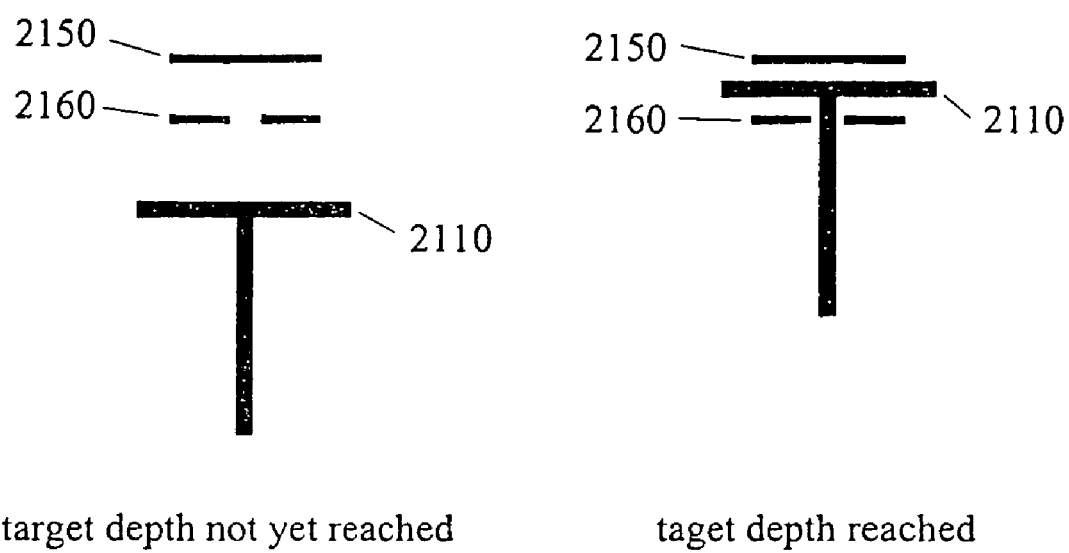
FIG. 21 is a diagram illustrating graphic depth markers for graphically representing instrument depth in virtual line-of-sight guided positioning of an instrument, according to an illustrative embodiment of the present invention.

FIG. 21 is a diagram illustrating graphic depth markers for graphically representing instrument depth in virtual line-of-sight guided positioning of an instrument, according to an illustrative embodiment of the present invention. Instrument depth corresponds to the relationship between graphic instrument depth marker 2110 and graphic target depth marker comprised of 2150 and 2160. Graphic instrument depth marker and graphic target depth marker move closer to each other as the instrument moves towards the target. When graphic instrument depth marker and graphic target depth marker line up as shown in the FIG. 21, target depth has been reached.

Figure 22:
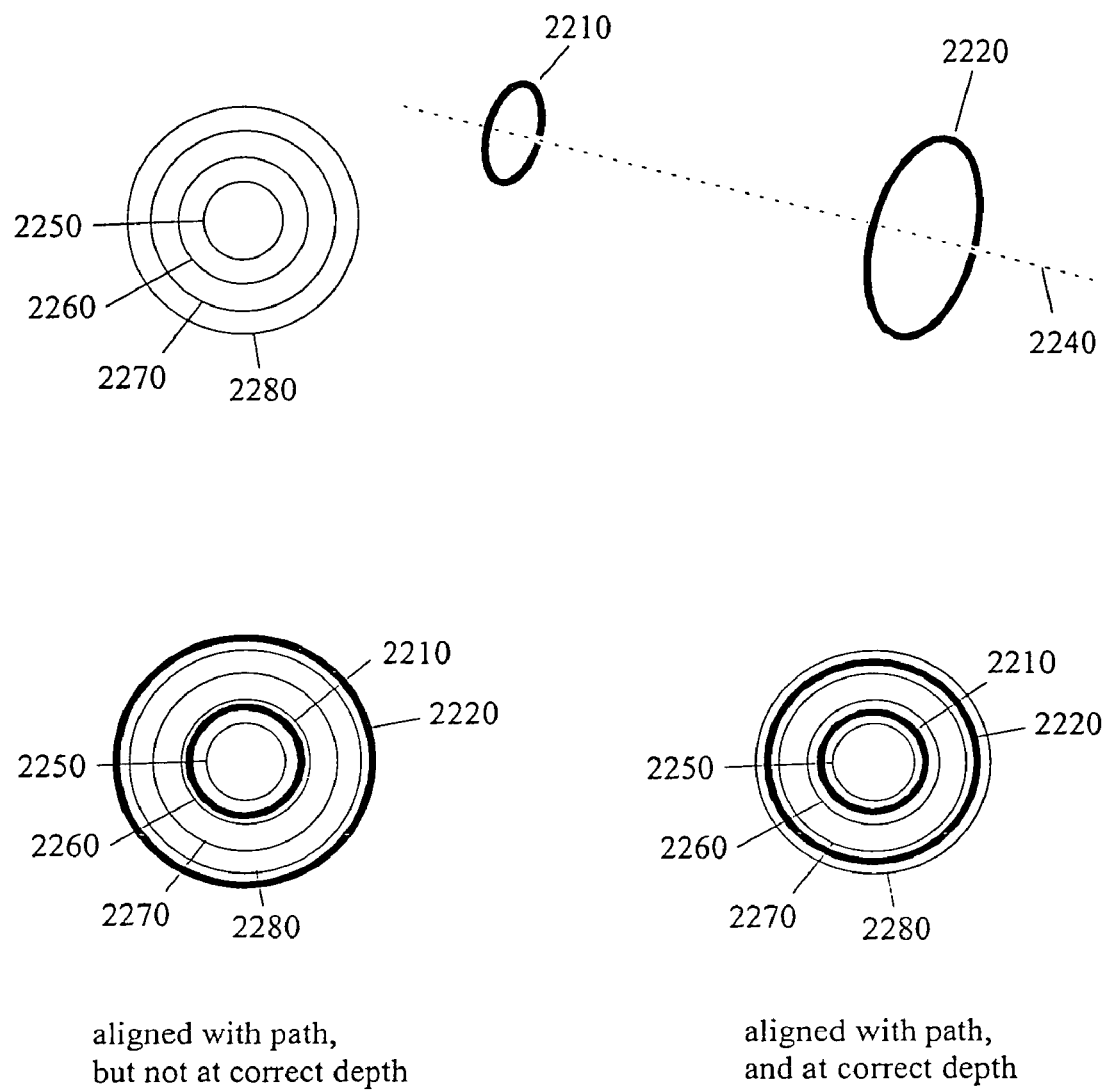
FIG. 22 is a diagram illustrating graphics depth marks and graphics path marks for virtual line-of-sight guided positioning of an instrument, according to an illustrative embodiment of the present invention.

FIG. 22 is a diagram illustrating graphic instrument markers (virtual instrument) and graphic target markers (virtual target) that simultaneously allow one to judge alignment with respect to the path and with respect to the depth, according to another illustrative embodiment of the present invention. The graphical target markers consist of four concentric circles 2250, 2260, 2270, 2280, their common center corresponding to the target point. The graphic instrument markers consist of two circles 2210 and 2220, centered on an axis 2240 corresponding to the instrument's axis, and located at different locations along the axis. When the path is aligned correctly, the graphical target markers and the graphical instrument markers appear concentric. Also, if the diameters of the markers appear so that each instrument circle falls between two corresponding target circles, the correct depth is reached as well.

Figure 23:
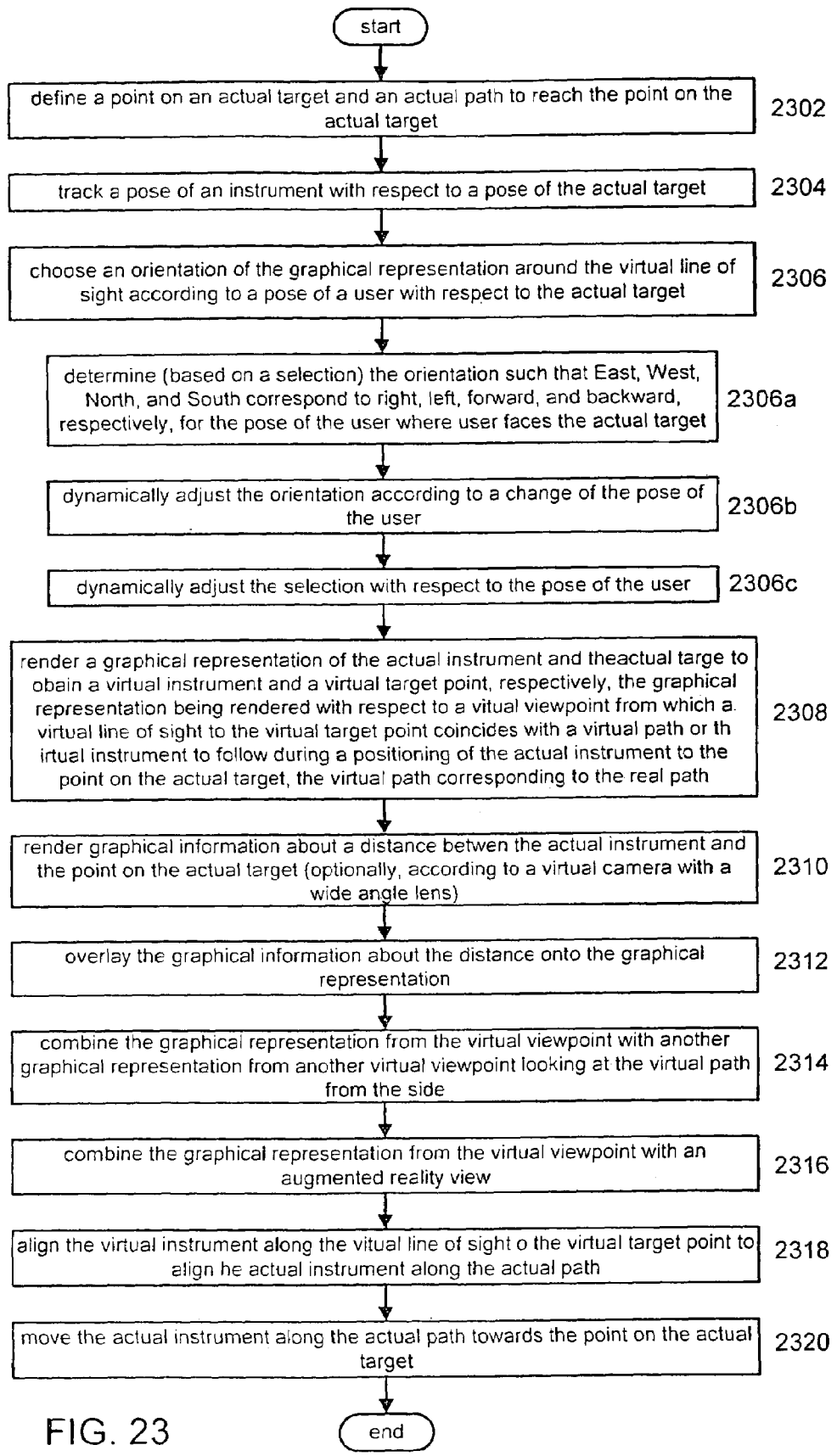
FIG. 23 is a flow diagram illustrating a method for virtual line-of-sight guided positioning of an instrument, according to an illustrative embodiment of the present invention.

FIG. 23 is a flow diagram illustrating a method for virtual line-of-sight guided positioning of an instrument, according to an illustrative embodiment of the present invention. A point is defined on an actual target and an actual path to reach the point on the actual target (step 2302). A pose of an actual instrument is tracked with respect to a pose of the actual target (step 2304).

An orientation is chosen of the graphical representation around the virtual line of sight according to a pose of a user with respect to the actual target (step 2306). Step 2306 may include steps 2306a, 2306b, and 2306c. With respect to step 2306a, the orientation is determined such that east, west, north, and south correspond to right, left, forward, and backward, respectively, for the pose of the user in which the user faces the actual target. The determining step (2306a) is based on a selection. With respect to step 2306b, the orientation is dynamically adjusted according to a change of the pose of the user. With respect to step 2306c, the selection is dynamically adjusted with respect to the pose of the user.

A graphical representation is rendered of the actual instrument and the actual target point to obtain a virtual instrument and a virtual target point, respectively (step 2308). The graphical representation is rendered with respect to a virtual viewpoint from which a virtual line of sight to the virtual target point coincides with a virtual path for the virtual instrument to follow during a positioning of the actual instrument to the point on the actual target. The virtual path corresponds to the actual path.

Graphical information is rendered about a distance between the actual instrument and the point on the actual target (step 2310). The rendering step may performed according to a virtual camera with a wide angle lens. The graphical information about the distance is overlaid onto the graphical representation (step 2312).

The graphical representation from the virtual viewpoint is combined with another graphical representation from another virtual viewpoint looking at the virtual path from the side (step 2314). The graphical representation from the virtual viewpoint is combined with an augmented reality view (step 2316). It is to be appreciated that step 2314 and 2316 are optional and one, both, or none may be performed in various implementations of the method of FIG. 23.

The virtual instrument is aligned along the virtual line of sight to the virtual target point to align the actual instrument along the actual path (step 2318). The actual instrument is moved along the actual path towards the point on the actual target (step 2320).

A description of graphics proximity markers for augmented reality guided instrument positioning will now be given according to an illustrative embodiment of the present invention.

A graphics proximity marker is a virtual depth gauge that is placed into an augmented view of an object into which the user wants to insert an instrument. The user inserts the instrument until a (real) marker on the instrument reaches the graphics proximity marker. At this point the insertion is complete, the tip of the instrument has reached the target.

The distance between the target and the graphics proximity marker is the same as the distance between the tip of the instrument and a marker on the instrument ("instrument marker"). The user inserts the instrument along a path that may also be marked with virtual guides until the instrument marker reaches the graphics proximity marker. Now the user knows that the tip of the instrument has reached the target even though he does not directly see the instrument's tip.

It is to be appreciated that more than one graphics proximity marker may be used to position an instrument. For example, a first graphics proximity marker may be used to indicate the outer surface of a target volume (e.g., a mass for which a biopsy is desired), and a second graphics proximity marker may be used to indicate an inner portion of the target volume (e.g., the center of the mass) at which the needle may be actuated by the user to perform the biopsy. It is to be further appreciated that two or more graphics proximity markers may be used to indicate a predetermined range (e.g., a range in which the needle is within the mass and not external with respect thereto).

Consider the task of inserting an instrument (e.g. a needle) into an object (e.g. a patient) where the instrument has to reach a predetermined target. The user does not have a direct view of the target, but the presence and position of the target as an internal structure of the "object" has been predetermined with some imaging means (e.g. CT scan).

Further consider that the user is guided to perform his task by augmented reality visualization. Superimposed on his or her view of the object, the user sees a graphical representation of the target, correctly registered with the actual position of the target. This augmented view is preferably in stereo to give the user 3D perception. Besides the target, graphical guides can be added to the augmented view to support the user in the correct insertion of the instrument.

If we do not track the instrument, we cannot visualize the hidden (inserted) parts of the instrument. We cannot see the tip of the instrument as it reaches the target. We only see the object and the part of the instrument outside of the object as well as the graphical information (target and/or guides) that we choose to overlay onto the view.

To find the right path, we align the outside part of the instrument (the part that is not yet inserted and hence visible to the direct view) with graphical (virtual) guides that we positioned in the augmented view to mark the path outside of the object. To find the right depth, we align a marker on the outside part of the instrument with a graphical proximity marker (virtual depth gauge) that we positioned outside of he object to mark the proximity of the instrument marker for the final desired instrument position. It is to be appreciated that virtual depth gauges can be applied for methods where the user looks at the path from an oblique angle as well as when the user looks along the path ("down-the-beam") as described herein.

Figure 24:
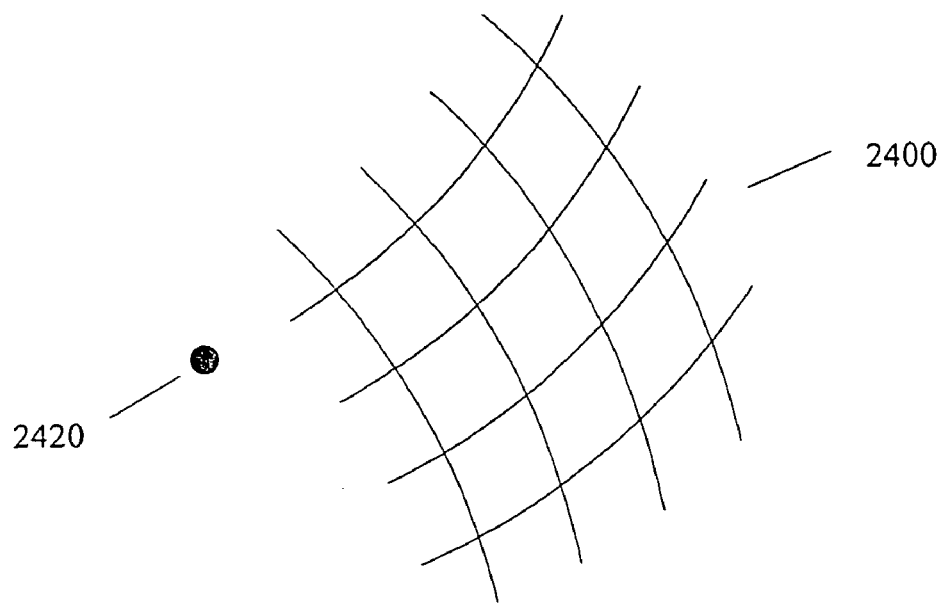
FIG. 24 is a diagram illustrating a graphics depth marker 2400 for augmented reality guided positioning of an instrument, according to an illustrative embodiment of the present invention.

FIG. 24 is a diagram illustrating a graphics depth marker 2400 for augmented reality guided positioning of an instrument, according to an illustrative embodiment of the present invention. In this example, the exact instrument path is not critical. The depth marker 2400 is implemented as a mesh that marks a predetermined distance from the target 2420, i.e., the mesh lies on part of a spherical surface with the target 2420 at the center.

Figure 25:
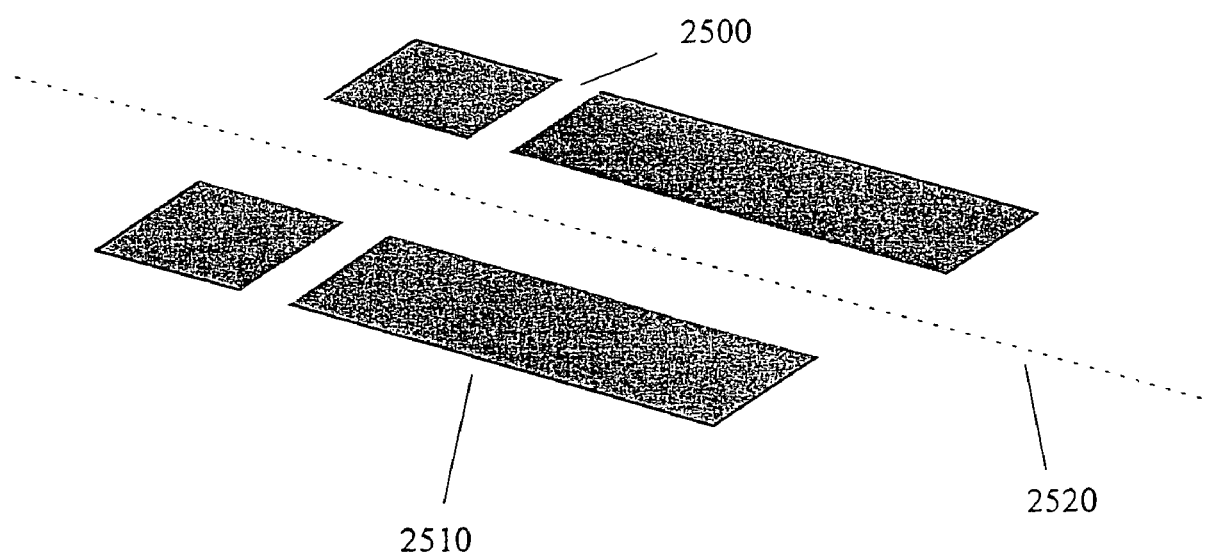
FIG. 25 is a diagram illustrating a graphics depth marker 2500 added to a graphics path guide 2510 for augmented reality guided positioning of an instrument, according to an illustrative embodiment of the present invention.

FIG. 25 is a diagram illustrating a graphics depth marker 2500 added to a graphics path guide 2510 for augmented reality guided positioning of an instrument, according to an illustrative embodiment of the present invention. In this example, the graphics path guide 2510 is normal to the desired path 2520 and is implemented as a slit. Of course, instead of a slit, any other kind of graphical marking that can mark a position along the path can be used, e.g., a darker line, an arrow, and so forth. The depth marker need not show any symmetry. For example, the depth marker can be planar, can surround the path in a ring-like structure, or can take be embodied as another 3D shape.

Figure 26:
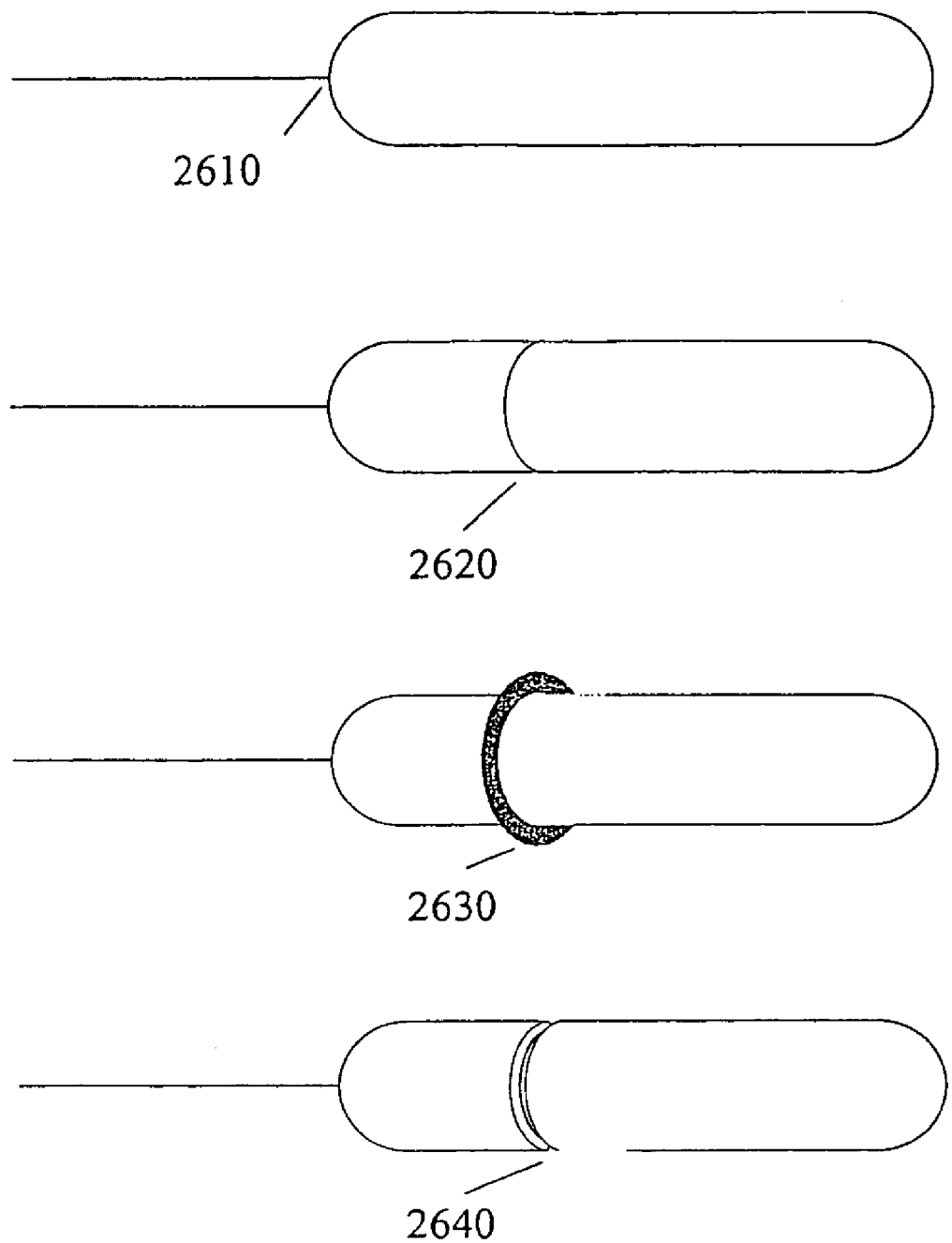
FIG. 26 is a diagram illustrating instrument markers used as depth markers for augmented reality guided positioning of an instrument, according to an illustrative embodiment of the present invention.

FIG. 26 is a diagram illustrating instrument markers used as depth markers for augmented reality guided positioning of an instrument, according to an illustrative embodiment of the present invention. It is to be appreciated that an existing feature of an instrument can be used as a depth marker (like 2610), as well as an added feature. The features can be surface structures (like 2620) or protruding or indented structures (like 2630 and 2640, respectively), or any other structure that can be used as a mark. In particular, they need not be rings as in the illustrated examples.

Figure 27:
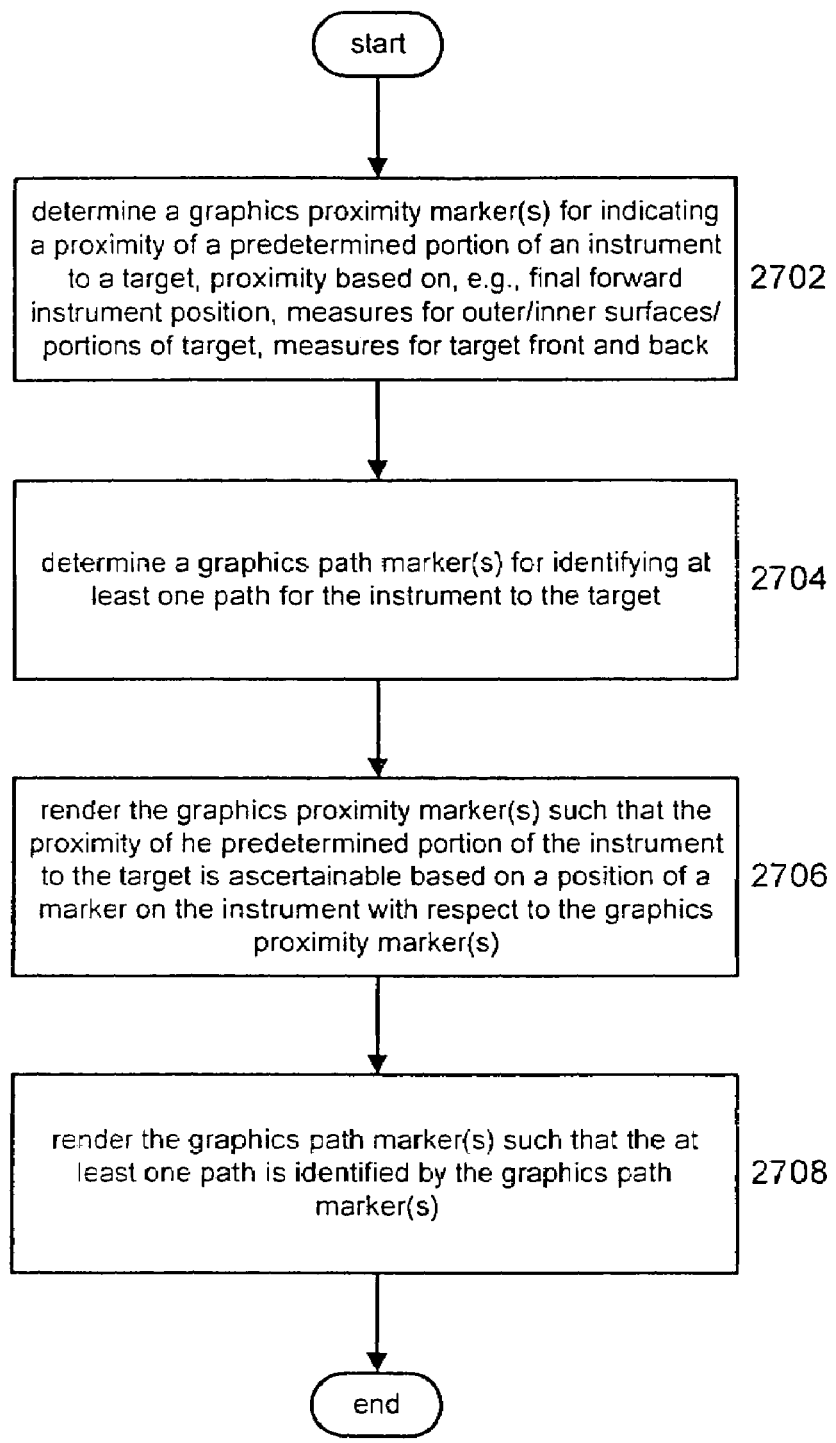
FIG. 27 is a flow diagram illustrating a method for indicating instrument depth for augmented reality guided instrument positioning, according to an illustrative embodiment of the present invention.

FIG. 27 is a flow diagram illustrating a method for indicating instrument depth for augmented reality guided instrument positioning, according to an illustrative embodiment of the present invention. At least one graphics proximity marker is determined for indicating a proximity of a predetermined portion of an instrument to a target (step 2702). The proximity may be based on, for example, a final forward position of the predetermined portion of the instrument with respect to the target, a first measure of proximity for indicating an outer surface of a target volume and a second measure of proximity for indicating an inner portion of the target volume, a first measure of proximity for indicating a front portion of a target volume and a second measure of proximity for indicating a back portion of the target volume (the front portion corresponding to entering the target volume and the back portion corresponding to exiting the target volume).

At least one graphics path marker is determined for identifying at least one path for the instrument to the target (step 2704).

The at least one graphics proximity marker is rendered such that the proximity of the predetermined portion of the instrument to the target is ascertainable based on a position of a marker on the instrument with respect to the at least one graphics proximity marker (step 2706). The at least one graphics path marker is rendered such that the at least one path is identified by the at least one graphics path marker (step 2708).

In general, it is to be appreciated that monoscopic vision is preferable to stereoscopic vision for the bull's eye alignment approach described herein, and stereoscopic vision is preferable to monoscopic vision for depth alignment (unless the user is willing to move his or her head and look from the side for depth checks). For monoscopic vision, the user may just close one eye, or the system can be switched between monoscopic and stereoscopic vision (for monoscopic vision the same video image is displayed on both screens of the stereo head-mounted display), or bull's eye alignment in sterescopic vision is made easier by showing the real scene in stereo, but overlaying the graphic guides only onto one of the views (preferably the one for the user's dominant eye).

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for augmented reality guided instrument positioning, comprising the steps of:
    determining a graphics guide for positioning an instrument that provides a substantially unobstructed view of the instrument during the positioning, the instrument comprising an elongated member having a tip;
    identifying a path out of a number of potential paths to be traversed during a potential positioning of the instrument as a predetermined path;
    constructing the graphics guide to frame the predetermined path with a window, the window comprising a circle having at least one opening such that the circle resemble a letter C, the at least one opening being larger than a width of the elongated member;
    orienting the window so that it is aligned with the predetermined path and visible to a user; and
    rendering and displaying the graphic guide in alignment with the predetermined path to be traversed during the positioning of the instrument.

2. The method according to claim 1, wherein said orienting step comprises the step of dynamically adjusting an orientation of the window relative to a vantage point of an observer.

3. The method according to claim 1, wherein said identifying step comprises the steps of:
   concluding whether an observer is one of right-handed and left-handed; and
   relating the predetermined path to a result of said concluding step.

4. The method of claim 1 further comprising the step of:
   tracking the instrument so that a pose of the instrument with respect to a target can be determined.

5. The method according to claim 4, wherein said tracking step further comprises the step of:
   rendering a representation of the instrument during positioning of the actual instrument that is registered with an actual position of the actual instrument.

6. The method according to claim 1, wherein said constructing step comprises the step of constructing a partial cylinder having a first end and a second end and the window disposed from the first end to the second end along a length-wise axis of the partial cylinder.

7. The method according to claim 6, wherein said rendering step comprises the step of orienting the partial cylinder so as to have the length-wise axis of the partial cylinder aligned with the predetermined path.

8. The method according to claim 1, wherein said method further comprises the steps of:
   identifying a target location for the tip of the elongated member; and
   orienting the circle such that the circle substantially encloses the target location and the at least one opening is one of to the right with respect to the observer when the observer is right-handed or to the left with respect to the observer when the observer is left-handed.

9. The method according to claim 1, wherein said method further comprises the steps of:
   identifying a target location for the tip of the elongated member; and
   orienting the circle such that the circle substantially encloses the target location and the at least one opening encloses an axis of the predetermined path.

10. The method according to claim 9, wherein said orienting step is performed dynamically.

11. The method according to claim 1, wherein said constructing step comprises the step of constructing a polygon that includes two opposing ends and the window disposed from one of the two opposing ends to another one of the two opposing ends.

12. The method according to claim 11, wherein said orienting step comprises the step of orienting the polygon so that a centerline of the window is aligned with the predetermined path.

13. The method according to claim 1, wherein said constructing step comprises the step of constructing a pattern of lines that surround a target location of the elongated member.

* * * * *